(12) United States Patent
Everson et al.

(10) Patent No.: US 9,919,935 B2
(45) Date of Patent: *Mar. 20, 2018

(54) ACID REGENERATION OF ION EXCHANGE RESINS FOR INDUSTRIAL APPLICATIONS

(71) Applicant: Ecolab USA Inc., St. Paul, MN (US)

(72) Inventors: Terrence P. Everson, Eagan, MN (US); Li Wen, Woodbury, MN (US); Lylien Tan, Maplewood, MN (US); Peter Voss, Eagan, MN (US); Mark Toetschinger, Mendota Heights, MN (US); Terry J. Klos, Victoria, MN (US); Mark Dennis Levitt, West St. Paul, MN (US); Sara Treder, Mendota Heights, MN (US); Toyin Alowonle, Cottage Grove, MN (US)

(73) Assignee: ECOLAB USA INC., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/179,496

(22) Filed: Jun. 10, 2016

(65) Prior Publication Data

US 2016/0362308 A1    Dec. 15, 2016

Related U.S. Application Data

(63) Continuation of application No. 13/802,915, filed on Mar. 14, 2013, now Pat. No. 9,387,471, which is a
(Continued)

(51) Int. Cl.
*C02F 1/42* (2006.01)
*B01J 39/20* (2006.01)
(Continued)

(52) U.S. Cl.
CPC ............... *C02F 1/42* (2013.01); *B01J 39/05* (2017.01); *B01J 39/07* (2017.01); *B01J 39/19* (2017.01);
(Continued)

(58) Field of Classification Search
None
See application file for complete search history.

(56) References Cited

U.S. PATENT DOCUMENTS

| 2,340,111 A | 1/1944 | D'Alelio |
| 2,676,922 A | 4/1954 | Waisbrot |

(Continued)

FOREIGN PATENT DOCUMENTS

| CN | 1304889 A | 7/2001 |
| CN | 1773279 A | 5/2006 |

(Continued)

OTHER PUBLICATIONS

Aquaclean Dolly Systems, http://www.ettore.com/professionals/aquaclean/dolly-systems/ [retrieved from the Internet on Mar. 25, 2013], 2 pages.
(Continued)

*Primary Examiner* — Chester T Barry
(74) *Attorney, Agent, or Firm* — McKee, Voorhees & Sease, PLC

(57) ABSTRACT

Methods and systems for employing softened acidified water sources from an acid regenerated ion exchange resins are disclosed. Various methods of dispensing and/or using the softened acidic water generated by an acid regenerate-able ion exchange resin are disclosed to beneficially reduce spotting, filming and scale buildup on treated surfaces, reduce and/or eliminate the need for polymers, including water conditioning agents, threshold reagents and/or rinse
(Continued)

aids, and using protons generated in the acidic water effluent for triggering events useful in various cleaning applications.

20 Claims, 18 Drawing Sheets

Related U.S. Application Data continuation-in-part of application No. 13/711,843, filed on Dec. 12, 2012, now Pat. No. 9,463,455.

(60) Provisional application No. 61/569,829, filed on Dec. 13, 2011.

(51) Int. Cl.
| | | |
|---|---|---|
| *B08B 3/04* | (2006.01) | |
| *B01J 39/05* | (2017.01) | |
| *B01J 39/07* | (2017.01) | |
| *B01J 39/19* | (2017.01) | |
| *B01J 49/06* | (2017.01) | |
| *B01J 49/53* | (2017.01) | |
| *B01J 49/75* | (2017.01) | |

(52) U.S. Cl.
CPC .............. *B01J 39/20* (2013.01); *B01J 49/06* (2017.01); *B01J 49/53* (2017.01); *B01J 49/75* (2017.01); *B08B 3/04* (2013.01); *C02F 2001/425* (2013.01); *C02F 2209/005* (2013.01); *C02F 2209/06* (2013.01); *C02F 2303/16* (2013.01)

(56) References Cited

U.S. PATENT DOCUMENTS

| | | | |
|---|---|---|---|
| 3,839,162 A | 10/1974 | Ammer | |
| 4,182,718 A | 1/1980 | Crutchfield et al. | |
| 4,336,140 A | 6/1982 | Smith et al. | |
| 4,363,880 A | 12/1982 | Whitney et al. | |
| 4,648,976 A | 3/1987 | Chen | |
| 4,917,806 A | 4/1990 | Matsunaga et al. | |
| 5,250,187 A | 10/1993 | Franks | |
| 5,651,398 A | 7/1997 | Decker et al. | |
| 5,915,592 A | 6/1999 | Mehus et al. | |
| 5,978,994 A | 11/1999 | Anderson | |
| 6,079,595 A | 6/2000 | Meyer et al. | |
| 6,158,486 A | 12/2000 | Olson et al. | |
| 6,921,743 B2 | 7/2005 | Scheper et al. | |
| 6,955,067 B2 | 10/2005 | Davenet et al. | |
| 7,413,637 B2 | 8/2008 | Scheper et al. | |
| 7,517,848 B2 | 4/2009 | Evans et al. | |
| 7,651,663 B2 | 1/2010 | Ayala et al. | |
| 7,704,330 B2 | 4/2010 | Rosenbauer | |
| 7,802,335 B2 | 9/2010 | Hoppe et al. | |
| 7,816,314 B2 | 10/2010 | Scheper et al. | |
| 9,387,471 B2* | 7/2016 | Everson | B01J 39/20 |
| 9,463,455 B2* | 10/2016 | Everson | B01J 39/20 |
| 2001/0049846 A1 | 12/2001 | Guzzi et al. | |
| 2005/0000902 A1 | 1/2005 | Newenhizen et al. | |
| 2005/0017114 A1 | 1/2005 | Gadini et al. | |
| 2005/0022314 A1 | 2/2005 | Ambuter et al. | |
| 2005/0256020 A1 | 11/2005 | Gardner et al. | |
| 2006/0054193 A1 | 3/2006 | Van Kralingen et al. | |
| 2006/0179583 A1 | 8/2006 | Ambuter et al. | |
| 2007/0072784 A1 | 3/2007 | Corradini et al. | |
| 2007/0102024 A1 | 5/2007 | Classen | |
| 2008/0271500 A1 | 11/2008 | Ahn | |
| 2008/0274939 A1 | 11/2008 | Monsrud et al. | |
| 2009/0099054 A1 | 4/2009 | Smith et al. | |
| 2009/0235481 A1 | 9/2009 | Gosebrunch et al. | |
| 2010/0164515 A1 | 7/2010 | Chan et al. | |
| 2010/0263688 A1 | 10/2010 | Monsrud et al. | |
| 2010/0263689 A1 | 10/2010 | Monsrud et al. | |
| 2011/0000511 A1 | 1/2011 | Mersch et al. | |
| 2011/0077144 A1 | 3/2011 | Jessen et al. | |
| 2013/0123162 A1 | 5/2013 | Souter et al. | |

FOREIGN PATENT DOCUMENTS

| | | | |
|---|---|---|---|
| DE | 2346801 A1 | 9/1973 | |
| DE | 102006011640 A1 | 9/2007 | |
| EP | 0325046 A1 | 12/1988 | |
| EP | 0725181 A1 | 8/1996 | |
| EP | 1085118 A2 | 3/2001 | |
| EP | 1110914 A2 | 6/2001 | |
| JP | 2005313162 A | 11/2005 | |
| KR | 20040081291 A | 9/2004 | |
| KR | 20070096223 A | 10/2007 | |
| KR | 20080107209 A | 12/2008 | |
| WO | 9703018 A1 | 1/1997 | |
| WO | 2004101443 A1 | 11/2004 | |
| WO | 2005106100 A1 | 11/2005 | |
| WO | 2010122508 A2 | 10/2010 | |
| WO | 2010122508 A3 | 10/2010 | |
| WO | 2010122509 A2 | 10/2010 | |
| WO | 2010122509 A3 | 10/2010 | |

OTHER PUBLICATIONS

Reverse Osmosis Window Washing System, http://www.cleanfreak.com/Qstore/p001713.htm [retrieved from the Internet on Mar. 25, 2013], 2 pages.

Waterfed Carts & Pure Water Systems, http://www.window-cleaning-supply.com/waterfed-equipment/carts-pure-water-systems/ [retrieved from the Internet on Mar. 25, 2013], 5 pages.

European Patent Office, "European Search Report", issued in connection to International Application No. PCT/US2012/069280, dated Apr. 23, 2015, 8 pages.

European Patent Office, "Extended European Search Report", issued in connection to International Application No. PCT/US2012069283, dated Apr. 28, 2015, 8 pages.

European Patent Office, "Extended European Search Report", issued in connection to International Application No. 14197370.1, dated Apr. 28, 2015, 7 pages.

CCPIT Patent and Trademark Law Office, "Office Action", issued in connection to Chinese Application No. 201280061475.0, 46 pages, dated Aug. 24, 2015.

CCPIT Patent and Trademark Law Office, "Office Action", issued in connection to Chinese Application No. 201280061500.5, 27 pages, dated Sep. 11, 2015.

Ecolab USA Inc., U.S. Appl. No. 13/711,888, filed Dec. 12, 2012, "Integrated Acid Regeneration of Ion Exchange Resins for Industrial Applications".

Dow Liquid Separations, DOWEX Ion Exchange Resin, DOWEX MAC-3 Engineering Information Jul. 2003.

\* cited by examiner

ACID REGENERATION OF ION EXCHANGE RESINS FOR INDUSTRIAL APPLICATIONS

CROSS-REFERENCE TO RELATED APPLICATIONS

This application is a continuation of U.S. Ser. No. 13/802,915, now U.S. Pat. No. 9,387,471, filed Mar. 14, 2013, which is a continuation-in-part of U.S. application Ser. No. 13/711,843, now U.S. Pat. No. 9,463,455, filed Dec. 12, 2012, which is a non-provisional application of U.S. Provisional Application No. 61/569,829, filed Dec. 13, 2011, both titled Acid Regeneration of Ion Exchange Resins for Industrial Applications, each of which are herein incorporated by reference in their entirety.

This application is further related to U.S. application Ser. No. 13/802,870, now U.S. Pat. No. 9,556,043 and Ser. No. 13/802,874, now U.S. Pat. No. 9,593,028, both titled "Urea Sulphate and Sodium Chloride Blend for Regeneration of Acid Cation Resins" each of which are herein filed simultaneously and incorporated by reference in their entirety.

FIELD OF THE INVENTION

The invention relates to methods of use and apparatus for the acid regeneration of ion exchange resins for various point of use cleaning applications. In particular, an acid regenerated resin is designed for use in any cleaning application using a water source to provide a softened acidic water source exhibiting relatively lower total dissolved solids (TDS). In addition, an acid regenerated resin is combined with a blending unit to incorporate the softened acidic water into a use solution of a cleaning composition to provide a cost effective and practical means for conditioning water intended for use in a cleaning composition dispenser. Beneficially, the various methods of using the softened acidic water generated by acid regenerate-able ion exchange resins provide a means for improving the quality of a cleaning use solution preferably generated at a point of use. In addition, the methods and apparatuses according to the invention are further beneficial in reducing spotting and filming on treated surfaces, preventing scale buildup on treated surfaces, reducing polymers and threshold reagents necessary in a detergent source, reducing water conditioning agents necessary in cleaning concentrates for dilution at a point of use, and using protons generated in the acidic water effluent for triggering events useful in various cleaning applications as disclosed herein.

BACKGROUND OF THE INVENTION

Various water treatment methods for decreasing hardness of water are known and commercially employed. Detergents and other cleaning agents often contain numerous components to improve the cleaning activity of the detergent, including for example, components to counteract the effects of water hardness. Hard water is known to reduce cleaning efficacy both by forming films on surfaces and reacting with detergent and other cleaning components, making them less functional in the cleaning process. Various methods for counteracting and/or eliminating water hardness have been implemented by those skilled in the art, including for example, adding chelating agents or sequestrants into detersive compositions in amounts sufficient to handle the hardness ions and/or softening a water source via ion exchange. Ion exchange can be used to exchange hardness ions, such as calcium and magnesium, in the water with sodium or other ions associated with a resin bed in a water softening unit.

Various ion exchange methods are known by those skilled in the art. Most commonly, water is run through an exchange resin to adhere the hardness ions calcium and magnesium to a resin in the softener. However, when the resin becomes saturated it is necessary to regenerate the resin using large amounts of sodium chloride dissolved in water. This regeneration process has numerous known disadvantages, namely requiring the use of briny solutions and chloride from added sodium chloride used to flush out the resin. Accordingly, when water softeners regenerate they produce a waste stream that contains significant amounts of sodium, creating a burden on the system, e.g., sewer system, in which they are disposed of. The generated waste presents a multitude of downstream water re-use concerns, including for example water re-use applications like potable water usage and agriculture. Further, traditional water softeners add to the salt content in discharge surface waters, which has become an environmental issue in certain locations. These and other limitations of commercially-available water softening methods are described in further detail in U.S. patent application Ser. No. 12/764,621, entitled "Methods and Apparatus for Controlling Water Hardness," the entire contents of which are hereby expressly incorporated herein by reference.

It is preferred that some means of water conditioning be employed for water sources to be used in formulating and/or diluting cleaning compositions. For example, useful water conditioning technologies include filtration and/or softening systems, such as via reverse osmosis (RO). A typical RO system includes a semipermeable membrane designed to permit passage of water (the solvent) and prevent passage of certain contaminants (the solutes). Pressure is applied to the incoming side of the membrane. The pressure may be supplied by the incoming water pressure and/or may be further adjusted using a pressure pump or other mechanism for increasing the incoming pressure. The contaminants are retained on the incoming side of the membrane and the purified water is allowed to pass through to the output side of the membrane. The contaminants may be flushed down a drain or otherwise disposed of, or in some applications can be reused. A typical RO generator may include one or more pre-filters, the RO membrane, and one or more post filters. The pre-filters remove particles such as sand, dirt, rust, and other sediment. The pre-filters may also include filters to remove chlorine, which may damage certain types of RO membranes. The RO membrane itself may include, for example, a TFC/TFM (thin film composite/material), a spiral wound CTA (cellulose tri-acetate). One or more post-filter(s) may be included to capture other chemicals not removed by the RO membrane.

However, there are various limitations to the use of such water conditioning methods, including RO systems. In particular, the large amount of waste water generated from the reverse osmosis process presents a significant limitation. In many instances, a conventional RO system rejects over 50% of the incoming water in need of treatment (e.g. efficiency is very low). Moreover, when the RO system is exhausted, the water is no longer softened (resulting in poor washing results on treated surfaces) and the parts are disposed.

In addition, it is often not desirable for a facility to condition its entire water supply to a building; therefore methods of conditioning as minimal a portion of a water supply as possible are desirable. Therefore, water treatment or conditioning is preferred for water sources employed as waters for dilution of cleaning compositions. Without water conditioning, most often, cleaning compositions are formulated to account for the lowest quality of water expected. As a result, cleaning compositions are formulated to include significant amounts of chemical water conditioning agents, such as chelating agents and/or water conditioning polymers, such as disclosed for example in the Background of U.S. patent application Ser. Nos. 12/764,621 and 12/764,606, which are herein incorporated by reference in their entirety. Similarly, cleaning compositions often exclude components dependent on softened water sources, due to the unreliability in source water conditions. For example, natural soaps are highly favorable from a sustainability standpoint in cleaning compositions (e.g. salts of natural fatty acids), however due to their minimal tolerance for hard water they are not often incorporated into cleaning compositions.

Accordingly, it is an object of the invention to provide a high quality, softened water source for use in dilution of cleaning compositions, to beneficially provide improved performance from conventionally generated cleaning compositions (e.g. employing an untreated water source from a facility).

In an aspect, the high quality, softened water source is provided according to specific water specifications desired for specific applications of use.

In an additional aspect, generated cleaning compositions according to the invention employ an additional set of ingredients (suitable for softened water compositions) can be formulated into compositions while reducing costs and reducing unnecessary chemical usage.

Accordingly, it is an objective of the claimed invention to develop improved methods and retrofitted systems for regenerating ion exchange resins for use in various institutional and industrial applications.

A further object of the invention is to develop a system and methods for using acid regenerate-able ion exchange resins to pre-treat water for the various institutional and industrial applications, resulting in the reduced demand for polymers and threshold reagents in cleaning compositions (e.g. detergents).

A further object of the invention is to improve cost effectiveness and quality of dispensed cleaning compositions using softened acidic water generated by the acid regenerate-able ion exchange resins at a point of use for dilution of a concentrate or generation of a cleaning composition.

Still further, the invention sets forth methods and systems for reducing scale buildup, spotting and/or film formation in cleaning compositions by treating a water source to be incorporated into a cleaning composition using an acid regenerate-able ion exchange resin.

A still further aspect of the invention is to apply acid cation exchange resins to improve water quality and thereby reduce the spotting and filming on treated glass surfaces, along with reducing the usage polymer and other threshold reagents in detergent.

BRIEF SUMMARY OF THE INVENTION

The methods of the invention overcome a significant limitation of the art; namely, the unpredictability of water quality at a point of use for generating a use solution of a cleaning composition. For example, a water source can be hard, soft, low TDS, high TDS, etc. depending on a facility's water supply characteristics. In the event cleaning compositions are generate on-site (or at a facility), this can lead to undesirable factors when generating cleaning compositions, including for example, overall lower quality of cleaning composition use solutions. For example, in the case of glass cleaners, it is often desirable to have low TDS water, preferably less than about 200 ppm, and more preferably less than about 100 ppm to reduce residues on the glass surface after cleaning.

In an aspect of the invention, a dispensing system employing an ion exchange resin regenerated by an acid is provided to generate a treated water source that meets a defined water specification. The system includes an inlet for providing a water source to a water conditioning unit, wherein the inlet is in fluid communication with the water conditioning unit. The system further includes a water conditioning unit comprising a water treatment component housed within, wherein said water treatment component comprises at least one weak acid and/or strong acid ion exchange resin capable of generating a treated water source by exchanging protons on said resin for dissolved cations including water hardness ions and total dissolved solids in said water source. The system further includes an outlet for providing the treated water source to a water delivery line, wherein the water delivery line is in fluid communication with the water conditioning unit and a blending unit, wherein the blending unit generates and/or dispenses a use solution of a cleaning composition by combining the treated water source with a concentrated cleaning composition. According to an aspect of the invention, the treated water source is softened, acidic water having total dissolved solids (TDS) of less than about 200 ppm, a hardness level of less than about 2 grains and a pH less than about 6.

In an aspect of the invention, a method of generating a use solution of a cleaning composition employing a water source that meets a defined water specification and was generated from an acid-regenerated ion exchange resin includes: first providing a water source to a water conditioning unit set forth according to the invention. In an aspect, the water conditioning unit generates a treated water source, wherein the treated water source is a softened, acidic water having a total dissolved solids (TDS) of less than about 200 ppm, a hardness level of less than about 2 grains and a pH less than about 6. In a further aspect, the treated water source is provided to a blending unit to generate and/or dispense a use solution of a cleaning composition by combining the treated water source with a concentrated cleaning composition.

In an aspect of the invention, a method of cleaning using a cleaning solution generated on-site employing a water source meeting a defined water specification generated from an ion exchange resin regenerated by an acid is provided. In an aspect, the methods include providing a water source to a water conditioning unit comprising a weak acid and/or strong acid ion exchange resin capable of generating a treated water source by exchanging protons on said resin for dissolved cations including water hardness ions and total dissolved solids in said water source. In a further aspect the generated treated water source is a softened, acidic water having a total dissolved solids (TDS) of less than about 200 ppm, a hardness level of less than about 2 grains and a pH less than about 6 which provides the water source for use with a blending unit to generate and/or dispense a use solution of a cleaning composition by combining the treated water source with a concentrated cleaning composition. In addition, the methods include the step of contacting a surface and/or substrate in need of cleaning with the use solution of the cleaning composition.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
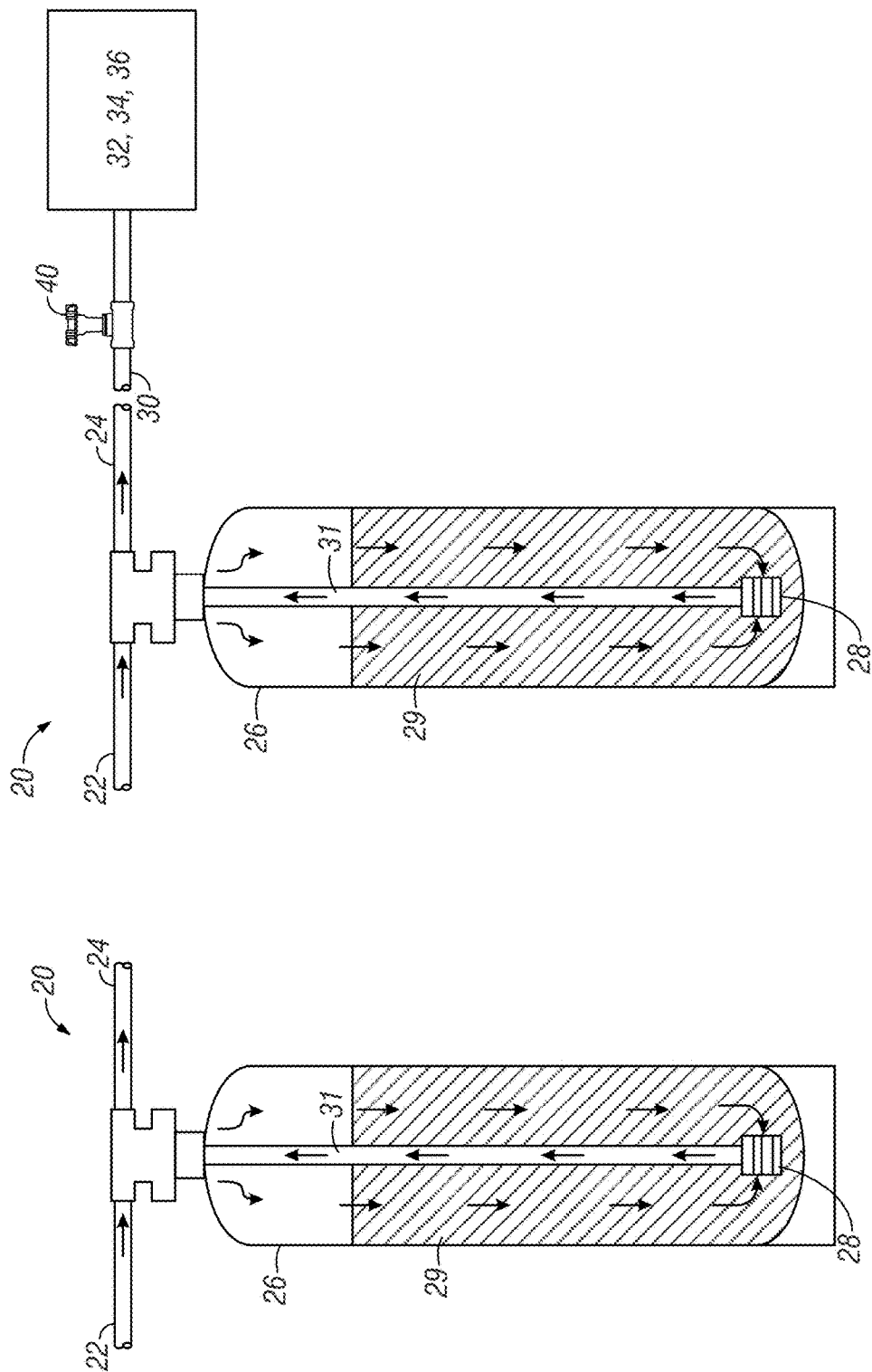
FIGS. 1A-1B show an embodiment of an apparatus that can be retrofitted to a system for use of an acid regenerating ion exchange resin in various cleaning applications.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

The present disclosure relates to methods and systems for using acid regenerate-able ion exchange resins at a point of use (i.e. non-integrated systems) to pre-treat water for various cleaning applications, including institutional and industrial applications. The methods and systems or apparatuses for obtaining and applying softened acidic water herein have many advantages over conventional water softening systems and/or apparatuses aimed at reducing water hardness. For example, the invention provides numerous unexpected downstream benefits, including for example, improving water quality and cleaning results, reducing consumption of detergents, other polymers and/or cleaning components in various cleaning applications, and preventing scale buildup, spotting and/or filming on treated surfaces. In addition, there are various advantages of the methods, systems and apparatuses using acid softened water generated at a point of use according to the invention to initiate downstream events in a cleaning application, including for example the regeneration of the resin and/or dispensing of additional cleaning components in a system.

The embodiments of this invention are not limited to particular methods, systems and apparatuses for obtaining softened acidic water at a point of use and applying softened acidic water to a particular cleaning application, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

As used herein, the terms "builder," "chelating agent," and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "builder," "chelating agent" and "sequestrant" are synonymous.

As used herein, the term "lacking an effective amount of chelating (or builder/sequestrant) agent" refers to a composition, mixture, or ingredients that contains too little chelating agent, builder, or sequestrant to measurably affect the hardness of water.

The term "cleaning," as used herein, means to perform or aid in soil removal, bleaching, microbial population reduction, or combination thereof.

As used herein, the term "disinfectant" refers to an agent that kills all vegetative cells including most recognized pathogenic microorganisms, using the procedure described in A.O.A.C. Use Dilution Methods, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, auto dish sanitizers, sanitizing gels, cooling towers, food processing antimicrobial garment sprays, and non-to-low-aqueous food preparation lubricants, oils, and rinse additives.

As used herein, the phrase "food product" includes any food substance that might require treatment with an antimicrobial agent or composition and that is edible with or without further preparation. Food products include meat (e.g., red meat and pork), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present invention. As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "laundry," refers to woven and non-woven fabrics, and textiles. For example, laundry can include, but is not limited to, clothing, bedding, towels and the like.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in Germicidal and Detergent Sanitizing Action of Disinfectants, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25+/−2° C., against several test organisms.

For the purpose of this patent application, successful microbial reduction is achieved when the microbial populations are reduced by at least about 50%, or by significantly more than is achieved by a wash with water. Larger reductions in microbial population provide greater levels of protection.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition.

As used herein, the term "solubilized water hardness" or "water hardness" refers to hardness minerals dissolved in ionic form in an aqueous system or source, i.e., $Ca^{++}$ and $Mg^{++}$. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate.

As used herein, the term "threshold agent" refers to a compound that inhibits crystallization of water hardness ions from solution, but that need not form a specific complex with the water hardness ion. This distinguishes a threshold agent from a chelating agent or sequestrant. Threshold agents include a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. Wares are often comprised of various types of plastics including but are not limited to, polycarbonate polymers (PC), acrilonitrile-butadiene-styrene polymers (ABS), and polysulfone polymers (PS). Another exemplary plastic includes polyethylene terephthalate (PET).

As used herein, the term "warewashing" refers to washing, cleaning, or rinsing ware. Ware also refers to items made of plastic.

As used herein, the terms "water" or "water source," refer to any source of water that can be used with the methods, systems and apparatuses of the present invention. The embodiments of the invention are particularly suitable for use of hard (i.e. non-softened) water sources. Exemplary water sources suitable for use in the present invention include, but are not limited to, water from a municipal water source, or private water system, e.g., a public water supply or a well. The water can be city water, well water, water supplied by a municipal water system, water supplied by a private water system, and/or water directly from the system or well. The water can also include water from a used water reservoir, such as a recycle reservoir used for storage of recycled water, a storage tank, or any combination thereof. In some embodiments, the water source is not an industrial process water, e.g., water produced from a bitumen recovery operation. In other embodiments, the water source is not a waste water stream.

As used herein, the term "water soluble" refers to a compound or composition that can be dissolved in water at a concentration of more than 1 wt-%. As used herein, the terms "slightly soluble" or "slightly water soluble" refer to a compound or composition that can be dissolved in water only to a concentration of 0.1 to 1.0 wt-%. As used herein, the term "substantially water insoluble" or "water insoluble" refers to a compound that can be dissolved in water only to a concentration of less than 0.1 wt-%. For example, magnesium oxide is considered to be insoluble as it has water solubility (wt-%) of about 0.00062 in cold water, and about 0.00860 in hot water. Other insoluble compounds for use with the methods of the present invention include, for example: magnesium hydroxide with a water solubility of 0.00090 in cold water and 0.00400 in hot water; aragonite with a water solubility of 0.00153 in cold water and 0.00190 in hot water; and calcite with a water solubility of 0.00140 in cold water and 0.00180 in hot water.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Embodiments of the Invention

According to an embodiment of the invention methods, systems and apparatuses provide for the use of acid regenerate-able ion exchange resins to pre-treat water for cleaning applications. Preferably, resins having a polymer matrix with carboxylic acid functional groups are used to capture water hardness ions and thereafter acids are used to regenerate the resin for re-use in generating a softened acidic water source for use in a cleaning application. Surprisingly, the present invention provides for novel uses of the various effluent waters of the methods, systems and apparatuses of the invention. In particular, whereas the effluent from the regeneration step is put to a waste stream and/or the effluent water from a service cycle is acidic softened water and may be used for washing or rinsing in a variety of cleaning applications. While an understanding of the mechanism is not necessary to practice the present invention and while the present invention is not limited to any particular mechanism of action, it is contemplated that, in some embodiments the benefits afforded according to the invention result from the generation of protons from the exchange of water hardness ions onto the resin.

According to a further embodiment of the invention, the methods, systems and apparatuses provide novel mechanisms for monitoring water sources. As opposed to monitoring and/or measuring water hardness ions in a water source, the use of conventional pH measurements can be used to trigger various events in a cleaning application. For example, a pH measurement (i.e. caused by the increase in protons/acidic water) can be used to trigger the step of regenerating the resin of a water treatment component or apparatus, and/or varying the detergent consumption needed to wash or rinse a surface in a particular cleaning application. Alternatively, the pH of incoming hard water can be compared to the treated acidic softened water, wherein the pH differential can be used to monitor a working system.

The invention overcomes the shortfalls of commercially-available water softening methods by providing an improved method for regenerating a resin and providing cleaning benefits from the treated effluent of a system, namely the protons contributing to cleaning efficacy in various cleaning applications. In addition, the invention provides the unexpected benefits of requiring the use of reduced amounts of polymers, threshold agents/reagents and/or other components in detergent compositions. In a further unexpected application, the invention provides for the elimination of a chemistry input into a cleaning application, such as acidic rinse aids.

One skilled in the art will ascertain additional benefits, uses and/or applications based upon the disclosure of the methods and systems of the present invention disclosed herein. Such embodiments are incorporated in the scope of the present invention.

Apparatuses and Systems for Water Treatment

In some embodiments the present invention relates to apparatuses and/or systems employing an acid regenerated ion exchange resin(s). The apparatuses and/or systems are suitable for use in controlling water hardness. In some aspects, the apparatuses and/or systems of the present invention include a substantially water insoluble resin material. Preferably, apparatuses and/or systems of the present invention do not precipitate a substance out of the water (e.g. a threshold agent). Without being limited to a particular theory of the invention, the apparatuses and/or systems result in the release of protons from the resin in exchange for binding water hardness ions onto the resin, causing an alteration in pH (i.e. acidic softened water), namely a decrease in pH as a result of the generation of protons from the resin. More preferably, the apparatuses and/or systems do not increase the total dissolved solids (TDS) of the water source treated. According to preferred aspects, the apparatuses and/or systems actually decrease the total dissolved solids (TDS) of the water source treated.

In some aspects, the apparatuses and/or systems of the present invention include a water treatment composition or water preparation system (herein after the terms are used synonymously). The water treatment composition may be in a variety of physical forms. In one embodiment the water treatment composition comprises a ion exchange resin.

Ion Exchange Resins

The ion exchange resin according to the apparatuses and/or systems of the invention may be in a variety of physical forms, including for example, a sheet, a bead, a membrane or the like. In some embodiments, the ion exchange resin is a substantially water insoluble resin material. In some embodiments, the ion exchange resin is an acid cation exchange resin. As disclosed herein, a variety of resin materials may be used with the apparatuses of the present invention to treat a water source by exchanging protons on the ion exchange resins for dissolved cations including water hardness ions and total dissolved solids in the water source.

In some embodiments, the resin material includes an acid cation exchange resin. The acid cation exchange resin may include a weak acid cation exchange resin, a strong acid cation exchange resin, and/or combinations thereof (often referred to as layered resin systems or beds, which may further include layered mixed resin systems or beds, as one skilled in the art appreciates).

In an embodiment the ion exchange resin is a strong acid exchange resin having a polystyrene matrix and sulfonic acid functional group. In an additional embodiment, the ion exchange resin may have a polystyrene with sulfonic acid functional group, polystyrene with sulfonic acid functional group and mixtures of thereof.

Weak acid cation exchange resins suitable for use in the present invention include, but are not limited to, a cross-linked acrylic acid with carboxylic acid functional group, a cross-linked methacrylic acid with carboxylic acid functional group, and mixtures thereof. In some embodiments, resin polymers have additional copolymers added. The copolymers include but are not limited to butadiene, ethylene, propylene, acrylonitrile, styrene, vinylidene chloride, vinyl chloride, and derivatives and mixtures thereof.

In a preferred embodiment the ion exchange resin is a weak acid exchange resin having a polyacrylic copolymer matrix and a carboxylic acid functional group. Preferably the ion exchange resin has a surface with functional groups comprising carboxylic acids. Alternatively, the ion exchange resin has a surface comprising functional groups comprising sulfonic acids.

In some embodiments, the resin material is an acrylic acid polymer that provides a polyacrylate material having a molecular weight of about 150 to about 100,000 to the water source. In other embodiments, the resin material provides a polyacrylate material having a relatively low molecular weight, such as a molecular weight less than about 20,000, to the water source. Without being limited according to the invention, all ranges of molecular weights recited are inclusive of the numbers defining the range and include each integer within the defined range.

In some embodiments, the resin includes a weak acid cation exchange resin having H+ ions attached to the active sites. In additional embodiments, the resin includes a weak acid cation exchange resin having carboxylic acid functional groups attached to the active sites.

Various commercially available weak acid cation exchange resins are available, and include but are not limited to: Amberlite® IRC 76 (Dow Chemical Company); Dowex® MAC-3 (Dow Chemical Company); and a variety of additional resins. Additional description of suitable resin materials and systems, including additional commercially available resins are disclosed in U.S. patent application Ser. No. 12/764,621, entitled "Methods and Apparatus for Controlling Water Hardness," the entire contents of which are hereby expressly incorporated herein by reference.

An alternative embodiment of the invention is the use of an anion exchange resin. Without wishing to be bound to a particular theory of the invention, use of an anion exchange resin may provide benefits through obtaining a softened alkaline water source.

As one skilled in the art will ascertain, the resin material may be provided in any shape and size, including beads, rods, disks or combinations of more than one shape. In some embodiments, the resin material is selected from the group consisting of a gel type resin structure, a macroporous type resin structure, and combinations thereof. Without wishing to be bound by any particular theory it is thought that the resin particle size may affect the ability of the resin material to control water hardness. For example, in some embodiments, the resin material may have a particle size of from about 0.5 mm to about 1.6 mm. In other embodiments, the resin material may have a particle size as large of 5.0 mm. The resin material may also include a mixture of particle sizes, viz. a mixture of large and small particles. Without being limited according to the invention, all ranges recited are inclusive of the numbers defining the range and include each integer within the defined range.

Additional factors that are thought to have an effect on the ability of the resin material to control water hardness include, but are not limited to, the particle size distribution, the amount of cross linking, and the polymers used. In some embodiments, the cross-linked polymer (e.g. acrylic acid) is about 0.5% cross-linked to about 25% cross-linked. In other embodiments, the polymer is less than about 8% cross-linked, less than about 4% cross-linked, or less than about 2% cross-linked. Without being limited according to the invention, all ranges recited are inclusive of the numbers defining the range and include each integer within the defined range.

In some embodiments, the ability of the resin material to control water hardness is impacted by whether there is a narrow particle size distribution, e.g., a uniformity coefficient of 1.2 or less, or a wide (Gaussian) particle size distribution, e.g., a uniformity coefficient of 1.5 to 1.9. Without being limited according to the invention, all ranges recited are inclusive of the numbers defining the range and include each integer within the defined range.

Further, it is thought that the selectivity of the resin can be modified to tailor the resin to have an affinity for one ion over another. For example, the amount of cross linking and type of polymers included in the resin are thought to impact the selectivity of the resin. A selective affinity for particular ions over other ions may be beneficial in situations where a high affinity for certain ions, e.g., copper, may be damaging, e.g., foul or poison, to the resin itself. The resin material may bind cations by a variety of mechanisms including, but not limited to, by ionic or electrostatic force.

Acid Regenerants

Acid regenerants suitable for use in the regeneration of the ion exchange resins according to the apparatuses and/or systems of the invention are necessary to remove water hardness ions from the resins. A variety of acid regenerants may be employed to provide protons to the resin to restore capacity to soften and acidify water in need of treatment according to the invention. In an aspect, the regenerant is an acid. Exemplary acids according to the invention include hydrochloric acid, sulfuric acid, phosphoric acid, nitric acid, citric acid, acetic acid, and methane sulfonic acid. In some aspects the acid regenerant is a strong acid. In other aspects the acid regenerant is a weak acid. In an additional aspect, the acid regenerant may be an inorganic and/or organic acid. In an additional aspect, the regenerant is an acid salt. Exemplary acid salts include urea sulfate and monosodium sulfuric acid. In a preferred aspect, the regenerant is urea sulfate.

In an aspect, the acid regenerant is housed in a storage reservoir in a concentrated form that is commercially-available. Concentrates preferably have pH less than about 5, preferably less than about 2, preferably less than about 1, and more preferably less than about 0. Without being limited according to the invention, all pH ranges recited are inclusive of the numbers defining the range and include each integer within the defined range. For example, concentrated urea sulfate having a pH from about −3 to about 1 is employed as a concentrated acid regenerant for the ion exchange resins of the invention.

Preferably, the acid regenerant is be diluted prior to passing over the ion exchange resin. This allows for the use of concentrated acid regenerants, which among other benefits reduces the transportation burdens and costs. In an aspect, the dilution ratio of acid regenerant to diluent (e.g. water) is from about 1:1 to about 1:20, preferably from about 1:2 to about 1:20. Without being limited according to the invention, all dilution ratio ranges recited are inclusive of the numbers defining the range and include each integer within the defined range.

In an aspect, the acid regenerant is in contact with the resin for a period of time from a few minutes to about 90 minutes, preferably from about one minute to about 60 minutes, and more preferably from about 5 minutes to about 30 minutes.

In an aspect of the invention, the concentration of the acid regenerant used in the regeneration cycle will depend upon the type of acid regenerant employed. In some embodiments, the concentration of the acid used in a solution for providing the acid regenerant to the ion exchange resin is from about 1% to about 20%, from about 2% to about 10%, or about 5% to about 10% of access of acid for regeneration. Without being limited according to the invention, all ranges recited are inclusive of the numbers defining the range and include each integer within the defined range. In addition, the amount of hardness in need of removal from the ion exchange resin will impact the amount of acid regenerant employed for the regeneration step of the invention.

Exemplary Water Preparation Systems

The apparatuses and/or systems of the present invention may be housed within a variety of water preparation systems, to provide point of use generation of acidified water for cleaning applications. The apparatuses and/or systems may be retrofitted to a variety of cleaning systems. Cleaning systems may include for example ware wash applications and any other cleaning system suitable for employing a softened acidic water source, including those of the invention exhibiting relatively lower total dissolved solids (TDS). Such additional cleaning systems may include for example, ware washing and/or sanitizing systems, laundry applications, hard surface and/or instrument cleaning, bottle washing, clean in place applications, and the like. In addition to cleaning systems suitable for application of the retrofitted systems of the invention, any dilution systems employing the treated softened acidic water source according to the invention are included within the scope of the present invention. These may include, for example, aspirators, pumps for delivering the treated water source and/or any other dilution system that is employed to deliver chemistry and/or a water source to a system.

An example of a water preparation system or apparatus 20 for use in the present invention is shown in FIGS. 1A-1B, which may comprise, consist of and/or consist essentially of:

an inlet 22 for providing a water source to a treatment reservoir 26; a treatment reservoir including a water treatment composition 28 (e.g. ion exchange resin) and the water source to be treated 29; an outlet 24 for providing treated acidic water 31 from the treatment reservoir 26; and a treated water delivery line 30 for incorporation of the treated acid water into a cleaning application, storage (e.g. reservoir) and/or shipment 32, 34, 36, respectively. As referred to herein, the water preparation system or apparatus 20 may further be referred to as a water conditioning unit or system.

According to the various methods of the invention, the water source 29 passes over the ion exchange resin 28, and water hardness cations from the water source 29 (e.g. calcium and magnesium ions) attach to the ion exchange resin 28, displacing protons into the treated water source creating an acidic softened water 31.

Figure 2:
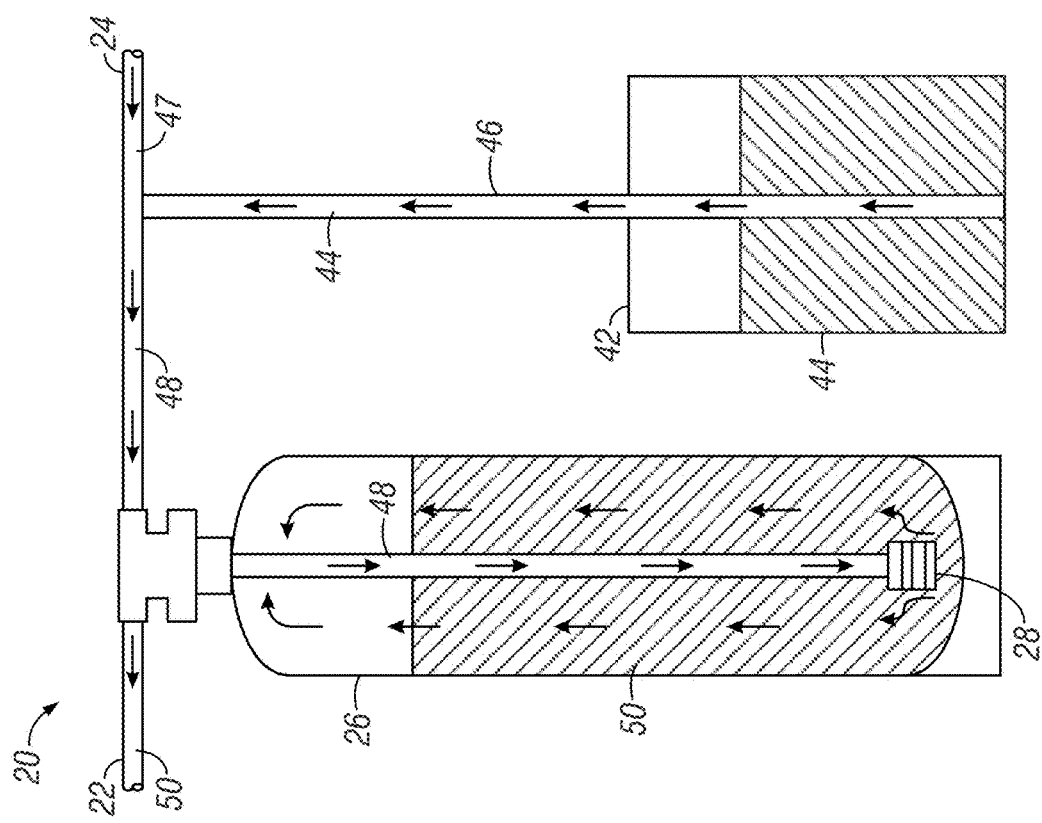
FIG. 2 shows an embodiment of the apparatus that uses an acid regenerant to regenerate an ion exchange resin according to the invention.

The apparatuses and/or systems of the present invention are designed for regeneration using an acid regenerant. Once the ion exchange resin 28 reaches a point of exhaustion (wherein the multivalent hardness cations from the water source have loaded onto the resin such that insufficient or no further exchange of cations occurs), an acid regenerant is used to remove the multivalent hardness cations from the cation exchange resin. An exemplary embodiment of such regeneration is shown in FIG. 2, wherein the water preparation system or apparatus 20 further comprises, consists of and/or consists essentially of a housing or storage reservoir 42 containing an acid source 44 and a delivery line 46 for providing the acid source 44 to the treatment reservoir 26. The delivery line 46 connects the acid source 44 with a water source 47 to generate a more dilute acid source 48 to regenerate the ion exchange resin 28. The diluted acid source 48 is then pumped into the treatment reservoir 26 to pass over the ion exchange resin 28 and cause the displacement of water hardness cations with the protons from the dilute acid source, thereby regenerating the exhausted ion exchange resin and generating a waste source of water containing hardness ions 50 to be removed from the water preparation system or apparatus 20.

The regeneration of the ion exchange resins can be triggered by a variety of events, as set forth in the description of the invention. In an embodiment, the concentrated acid source 44 from the storage reservoir 42 is combined with the water source due to atmospheric pressure within the system triggered by an event. Triggering events, as referred to herein for the regeneration of the ion exchange resins can include, for example, scheduled regeneration cycles based upon either set amounts (i.e. threshold levels) of the following and/or measurements and targeted amounts of the following, including for example, volume of water treated by an ion exchange resin, TDS levels in the treated water and/or water source to be treated according to the invention, pH of the treated water, number of cleaning events/cycles since the previous regeneration of the ion exchange resin, and the like.

As depicted in FIG. 2, the regeneration step moves the liquids in the opposite direction through the inlets and outlets, 22 and 24 respectively, as that described with respect to FIGS. 1A-1B when the ion exchange resin 28 is used to remove water hardness to generate the softened acidified water. Beneficially, this reduces the complexity of the water preparation system or apparatus 20 in minimizing the number of inlets/outlets and delivery line. In an additional embodiment, the waste product from the regeneration step (i.e. water containing hardness ions 50) could be added to the water source 29 for subsequent treatment according to the methods of the invention.

The apparatuses and/or systems of the present invention may further employ layered resin beds and/or layered mixed resin beds, as shown in FIGS. 3A-3B, respectively. In an embodiment of the invention, a layered resin bed includes more than one acid cation exchange resin. For example, as shown in FIG. 3A, the water preparation system or apparatus 20 may comprise, consist of and/or consist essentially of: a first inlet 22 for providing a water source to a first treatment reservoir 26 (housing a first ion exchange resin 28); a first outlet 24 for providing the treated acidic water from the first treatment reservoir 26 to a second treatment reservoir 26; a second inlet 22 for providing the treated water source to the second treatment reservoir 26 (housing the second ion exchange resin 28); and a second outlet for providing the treated acidic water to a treated water delivery line 30. It is to be understood from the description of the invention that a plurality of resin beds may be employed, e.g. more than two treatment reservoir 26 and more than two ion exchange resins 28. As set forth with respect to FIG. 1B, various embodiments of the invention may be employed for the delivery of the treated acid water into a cleaning application, storage (e.g. reservoir) and/or shipment 32, 34, 36.

In a further embodiment, as shown in FIG. 3B, the water preparation system or apparatus 20 may include a layered mixed resin bed which may comprise, consist of and/or consist essentially of: a first inlet 22 for providing a water source to a first treatment reservoir 26 (housing a first ion exchange resin 28); a first outlet 24 for providing the treated acidic water from the first treatment reservoir 26 to a second treatment reservoir 26; a second inlet 22 for providing the treated water source to the second treatment reservoir 26 (housing the second ion exchange resin 28, wherein the second ion exchange resin is a different ion exchange resin from that housed in the first treatment reservoir or wherein the second ion exchange resin contains more than one type of ion exchange resin, one of which may be the same as the ion exchange resin housed in the first treatment reservoir); and a second outlet for providing the treated acidic water to a treated water delivery line 30.

The layered acid cation exchange resins depicted in FIGS. 3A-3B may include combinations of weak acid cation exchange resins, strong acid cation exchange resins, and/or combinations of both weak acid cation exchange resins and strong acid cation exchange resins.

Figure 4:
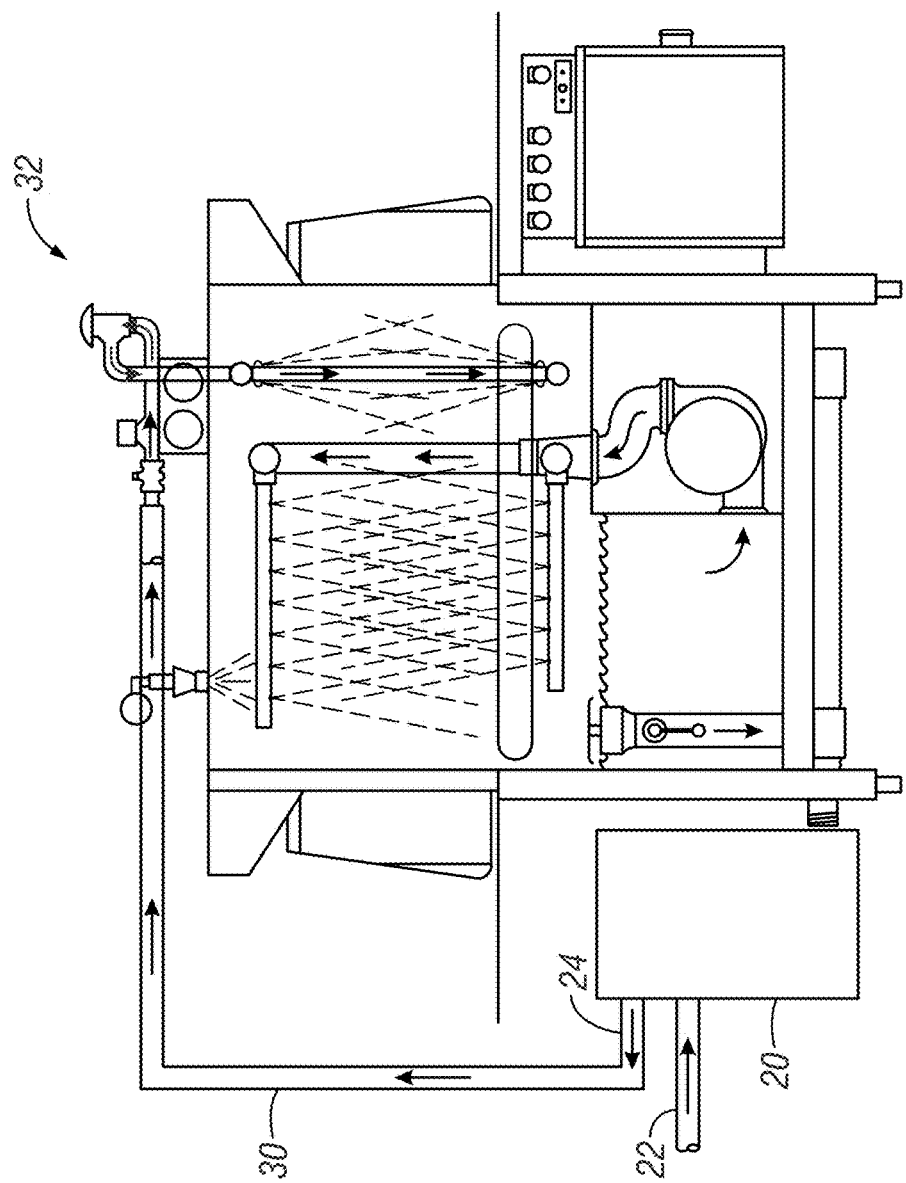
FIG. 4 shows an embodiment of the invention of a retrofitted ware wash system using an acid regenerating ion exchange resin apparatus to generate acidified water for use in a cleaning application.

In some embodiments, the treated water delivery line 30 of a water preparation system or apparatus 20 provides treated water 31 to a selected washing and/or cleaning system 32, as shown in FIG. 4. As shown in the illustrated embodiment, the treated water delivery line is connected to a ware wash machine as source of treated water for the depicted cleaning application. As set forth according to the invention, the treated water delivery line may be connected to a variety of additional cleaning applications, including for example, Ware washing, including for example, automatic ware washing machine, a vehicle washing system, an instrument washer, a clean in place system, a food processing cleaning system, a bottle washer, etc.; laundry applications, including for example, automatic laundry/textile washing machines; industrial and domestic applications; and hard surface cleaning applications, including for example, clean-in-place systems (CIP), clean-out-of-place systems (COP), automatic bottle washers, washer-decontaminators, sterilizers, ultra and nano-filtration systems, indoor air filters, etc.

Figure 5:
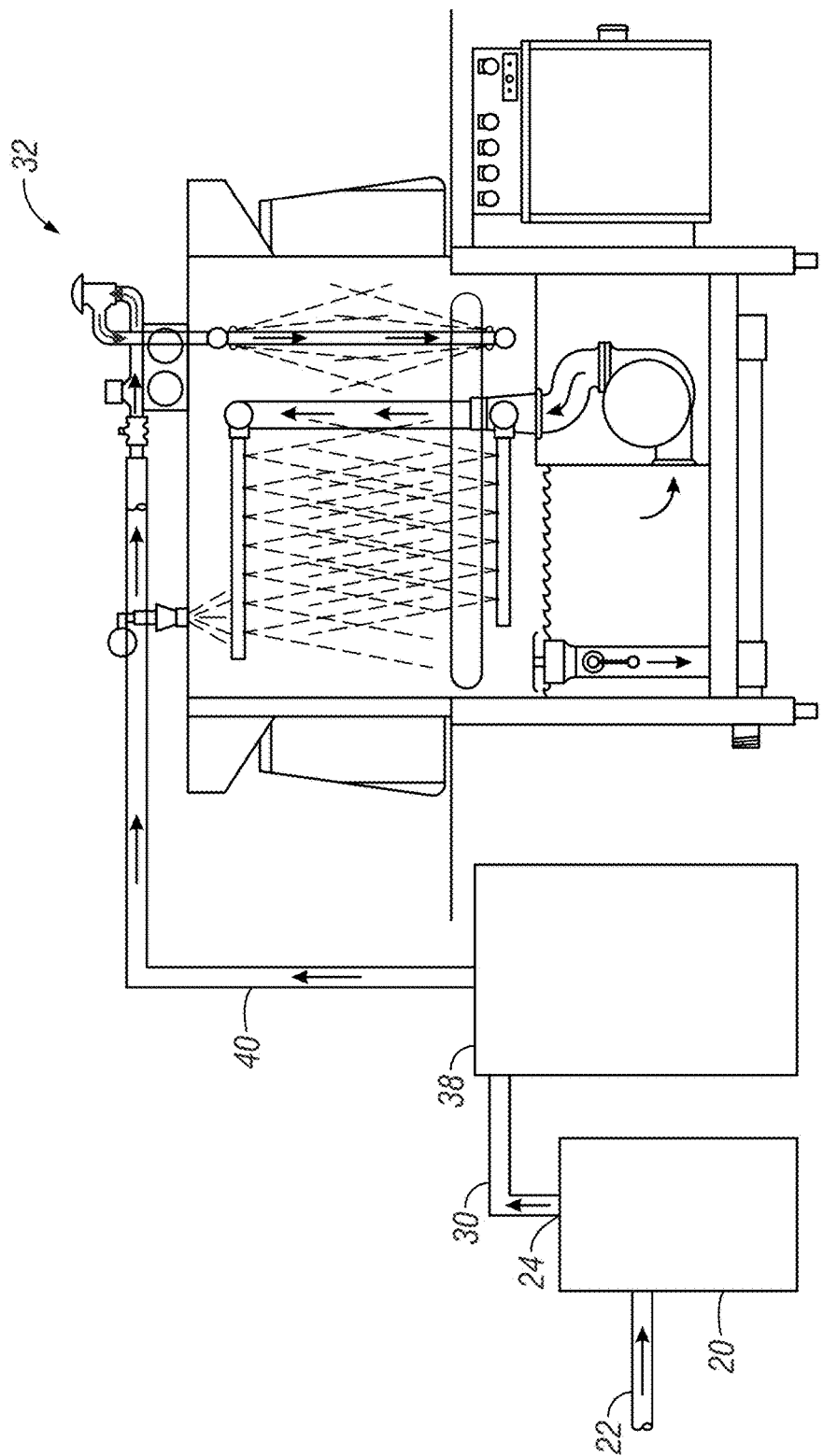
FIG. 5 shows an embodiment of the invention of FIG. 4 further employing an additional water treatment apparatus with the acid regenerating ion exchange resin apparatus.

In other embodiments, the treated water delivery line 30 provides the treated acidic water 31 to an additional water treatment apparatus 38, as shown in FIG. 5. The additional water treatment apparatus 38 may include for example, a carbon filter or a reverse osmosis filter. Thereafter the treated water may again be provided as a source for a cleaning application, stored (e.g. reservoir) and/or shipped to an alternative point of use (e.g. 32, 34, 36). The water that was treated with the additional water treatment apparatus 38 may then be connected by a second water delivery line 40 to the cleaning application, stored (e.g. reservoir) and/or shipped to an alternative point of use (e.g. 32, 34, 36). One skilled in the art shall ascertain that one or more additional water treatment apparatuses may be employed with the water preparation system or apparatus 20 of the invention. In addition, the one or more additional water treatment apparatuses may be employed before or after the water source is treated according to the methods of the invention with the water preparation system or apparatus 20. As such, the configuration of the water preparation system or apparatus 20 shown in FIG. 5 treating a water source with the ion exchange resin 28 prior to use of the additional water treatment apparatus 38 is a non-limiting embodiment of the invention. In a still further alternative embodiment, no additional water treatment apparatuses are employed with the water preparation system or apparatus 20 of the invention.

In some embodiments, there is no filter between the outlet and the treated water delivery line. In other embodiments, there is a filter between the outlet and the treated water delivery line. In addition, a flow control device 40 such as a valve or other mechanism for controlling the flow or pressure of the liquids disposed therein for transport can be provided in the treated water delivery line 30 to control the flow of the treated water 31 into the selected end use device, e.g., a washing system, or another water treatment device 32, such as shown in FIG. 1B. In an alternative embodiment, the flow rate of both the water source and/or treated water can be controlled by flow control devices. In some embodiments, the water treatment reservoir 26 is any reservoir capable of holding the water treatment composition (e.g. ion exchange resin) 28. The reservoir 26 can be for example, a tank, a cartridge, a filter bed of various physical shapes or sizes, or a column. In other embodiments, the resin material may be attached or adhered to a solid substrate. The substrate can include, but is not limited to, a flow-through filter type pad, or paper. The substrate can also be a particulate that can be fluidized.

The apparatuses and/or systems of the present invention can include one or more water treatment reservoirs 26. For example, two, three or four treatment reservoirs containing the same or different water treatment compositions 28 can be used. The one or more treatment reservoirs can be provided in any arrangement, for example, they may be provided in series, or in parallel. In some further embodiments, the entire treatment reservoir can be removable and replaceable. In other embodiments, the treatment reservoir can be configured such that water treatment composition contained within the treatment reservoir is removable and replaceable.

Figure 3:
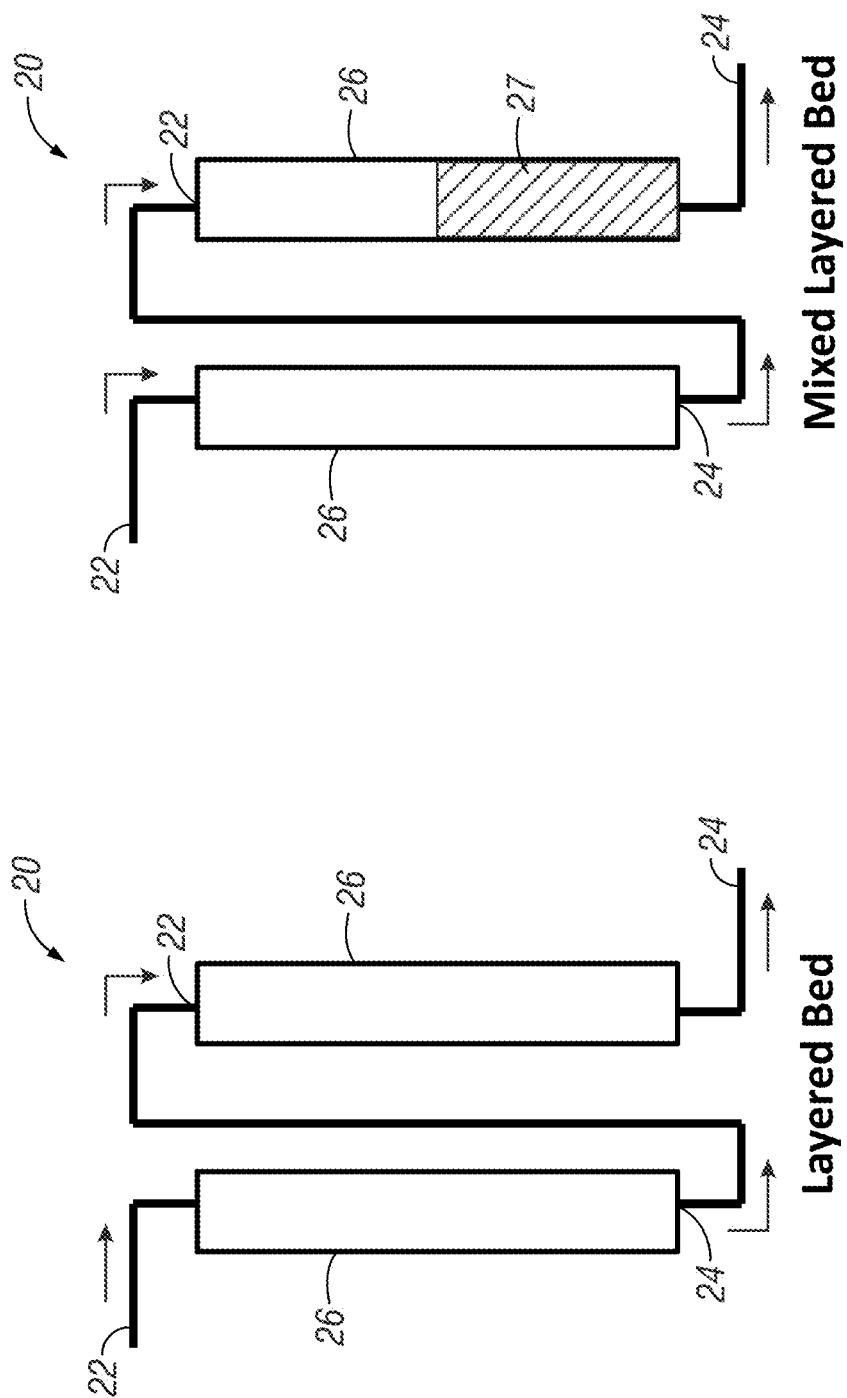
FIGS. 3A-3B show an embodiment of the invention using a layered ion exchange resin bed (3A) and a mixed layered ion exchange resin bed (3B) for treating a water source.

The treatment reservoir may include an inlet for providing water to the treatment reservoir and an outlet for providing treated water to a desired end use location, e.g., a washing device or another water treatment device. In some embodiments, the inlet is located at the top of the reservoir, and the outlet is located at the bottom of the reservoir, such as shown in FIG. 3. In alternative embodiments, the inlet is located at the bottom of the reservoir, and the outlet is located at the top of the reservoir. This allows for the water to flow up through the water treatment composition contained within the treatment reservoir. In still further embodiments, the inlet and outlet may be located at the top of the reservoir, such as shown in FIGS. 1-2. However, as one skilled in the art will ascertain, the layout and/or design of a treatment reservoir and/or the placement and orientation of the treatment reservoir within the water preparation system or apparatus will vary and may be customized to a particular institutional or industrial application for use.

In some embodiments, the treatment reservoir includes an agitated bed of the water treatment composition. Methods for agitating the composition include, for example, flow of water through a column, by fluidization, mechanical agitation, air sparge, educator flow, baffles, flow obstructers, static mixers, high flow backwash, recirculation, and combinations thereof. The treatment reservoir can further include a head space above the composition contained therein, in order to allow for a more fluidized bed. In some embodiments, the resin material has a density slightly higher than the density of water to maximize fluidization and/or agitation of the resin material.

In some embodiments, the inlet can further include a pressurized spray nozzle or educator nozzle. The spray nozzle can provide the water at an increased force to the treatment reservoir. This increased pressurized force can increase the agitation of the water treatment composition and can circulate the resin through the educator nozzle. In some embodiments, the spray nozzle provides the water to the treatment reservoir at a rate of about 5 feet per minute to about 200 feet per min.

Figure 14:
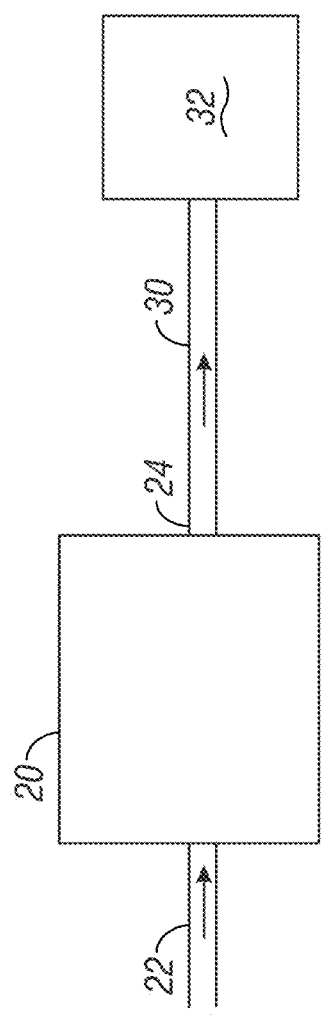
FIG. 14 shows a non-limiting diagram of an on-site application of use of a water conditioning unit (e.g. comprising an acid ion exchange resin according to embodiments of the invention) for use as a softened acidic water composition for a cleaning application.

In an additional embodiment, as shown in FIG. 14, the water preparation unit 20 is utilized on site for a cleaning application 32 (e.g. the treated acidic water 31 is employed as a cleaning composition). In an aspect, a system for application of use of the treated acidic water 31 for a cleaning application may comprise, consist of and/or consist essentially of: an inlet 22 for providing a water source to the water conditioning unit 20; an outlet 24 for providing treated acidic water 31 from the water preparation unit 20; and a treated water delivery line 30 for providing of the treated acid water 31 to a cleaning application 32 (which may further include dispensing the treated acid water 31 into a container, e.g. spray bottle or other administration device).

In a further aspect, as shown in prior figures, the water conditioning unit 20 may comprise, consist of and/or consist essentially of a water treatment reservoir 26 including a water treatment composition 28 (e.g. ion exchange resin) and the water source to be treated 29.

Figure 15:
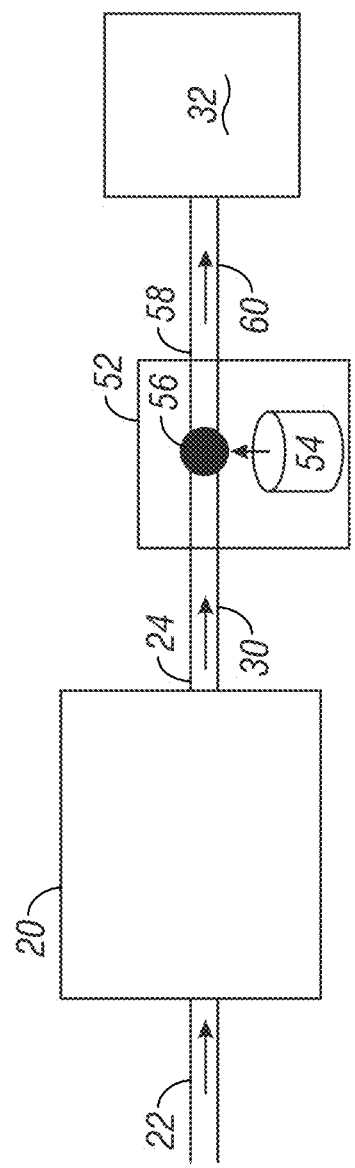
FIG. 15 shows a non-limiting diagram of an on-site application of use of a water conditioning unit for diluting a cleaning composition at a point of use according to embodiments of the invention.

In a further embodiment, as shown in FIG. 15, the water conditioning unit 20 is used in combination with a blending unit (or a dispensing or dilution unit) 52 to use the treated acidic water 31 as a means of dilution of a concentrated cleaning composition 54 to provide a use solution 59 of the cleaning composition. The blending unit (e.g. dispensing and/or dilution unit) may include any variety of units, such as those commercially-available and described further below for dispensing and/or diluting a concentrate composition with a specific dilution amount of the softened acidic water according to the invention. In the depicted exemplary embodiment, the system includes an inlet 22 for providing a water source to the water conditioning unit 20; an outlet 24 for providing treated acidic water 31 from the water preparation unit 20; a treated water delivery line 30 for providing of the treated acid water 31 to the blending unit 52; an outlet 58 for providing the use solution of the cleaning composition 59; and a use solution delivery line 60 for providing the use solution of the cleaning composition 59 to a cleaning application 32 (which may further include dispensing the use solution of the cleaning composition 59 into a container, e.g. spray bottle or other administration device).

Without limiting the scope of the invention, the embodiments depicted in FIGS. 14-15 may further be employed to provide either the treated acid water 31 or the use solution of the cleaning composition 59 into a cleaning application, storage (e.g. reservoir) and/or shipment 32, 34, 36, respectively.

As disclosed herein, the treatment reservoirs housing the resins employed according to the invention may vary in its set-up, orientation, shape and/or size while maintaining the functionality disclosed herein for the treatment of water to provide a softened, acidic water source. For example, in an aspect of the invention a longer or narrower housing may be employed for the treatment reservoirs and/or resins to maximize or increase the contact time of the water source with the resin systems. In another aspect of the invention, the treatment reservoirs and/or resins may be shorter in length and/or wider to have a relatively shorter contact time between the water source and the resin system and/or to maximize flow rate and/or pressure drop within the system. According to an aspect of the invention, the shape and size of the housing for the treatment reservoirs and/or resins is adjustable and/or can be modified in order to balance the amount of time a water source is in contact with the cation exchange resin. As one skilled in the art shall appreciate based on the disclosure of the invention, such contact time between the water source and the exchange resin will further impact the characteristics of the treated acidified water source, such as the extent of acidification of the water, amount of TDS and/or extent of removal of hardness ions.

Additional Functional Groups

In some embodiments, an additional functional ingredient may be included in the water preparation systems along with the water treatment composition (e.g. ion exchange resin) housed within a treatment reservoir. The additional functional ingredients can be included within the treatment reservoir and/or water treatment composition, or they can be provided to the treatment reservoir from an external source, e.g., an additional functional ingredient inlet.

Additional functional ingredients can be added directly to the water source to be treated prior to the water source entering the treatment apparatus. Alternatively, the additional ingredient can be added to the treatment reservoir prior to the water source being passed through the ion exchange resin.

Additional functional ingredients suitable for use with the apparatuses and/or systems of the present invention include any materials that impart beneficial properties to the water treatment methods, the water source being treated, or any combination thereof. Examples of suitable additional functional ingredients include surfactants, preferably surfactants exhibiting wetting properties (e.g. rinse additives to increase sheeting), sanitizing agents and/or sterilizing agents (e.g. providing sanitizing rinse), acidic detergents, enzymatic detergents and the like.

Methods of Treating a Water Source According to the Invention

In some examples, treated water sources having one or more of the following example ingredient water specifications are generated:

| Ingredient Water Specification | Total Dissolved Solids (TDS) | Water Hardness (grains) | pH |
|---|---|---|---|
| Specification 1 | 0-200 ppm | <=3 | <=7 |
| Specification 2 | 0-100 ppm | <=2 | <=6 |
| Specification 3 | 0-50 ppm | <=1 | <=5 |

However, it shall be understood that other ingredient water specifications may also be defined, that the above ingredient water specification are for example purposes only, and that the disclosure is not limited in this respect.

In some aspects, the present invention provides methods for controlling water hardness and producing an acidic softened water source. Acidic softened water having a hardness of less than about 2 grains, less than about 1 grain and/or 0 grains is produced according to the invention. In another aspect, the acidic softened water has a pH less than about 7, and more preferably less than about 6, is produced according to the methods of the invention. In another aspect, the acidic softened water has a low total dissolved solids (TDS) of at least less than 200 ppm, preferably less than 100 ppm and still more preferably less than 50 ppm. In an aspect, the acidic softened water has a hardness of less than about 2 grains, a pH less than about 7, and a low total dissolved solids (TDS) of at least less than 200 ppm. In a further aspect, the acidic softened water has a hardness of less than about 1 grain, a pH less than about 6, and a low total dissolved solids (TDS) of at least less than 100 ppm. In a still further aspect, the acidic softened water has a hardness of about 0 grains, a pH less than about 6, and a low total dissolved solids (TDS) of at least less than 50 ppm. Thereafter the acidic softened water can be employed for a variety of cleaning applications, whether at a point of use or stored for such use at a later time and/or point of use.

In an aspect, the specifications of the treated water source can be specified according to a desired application of use. For example, in one aspect, a warewashing application and/or other all-purpose cleaning composition may employ a treated water source that comprises, consists of and/or consists essentially of an acidic softened water has a hardness of less than about 2 grains, a pH less than about 7, preferably less than about 6, and a low total dissolved solids (TDS) of at least less than 200 ppm. In another aspect, a cleaning composition for a glass surface may employ a treated water source that comprises, consists of and/or consists essentially of an acidic softened water has a hardness of less than about 1 grain, a pH less than about 7, preferably less than about 6, and a low total dissolved solids (TDS) of at least less than 100 ppm. Beneficially, according to the invention, the resin(s) employed for use of the methods of the invention may be modified along with and/or in addition to the characteristics of the incoming water source in need of treatment. As a result, according to embodiments of the invention, the treated water source for uses disclosed herein can be particularly modified for any specific application of use.

The methods directed to controlling water hardness are also understood to include methods for reducing scaling, buildup and/or soiling on treated surfaces wherein the acidic softened water according to the invention is applied. In addition, the methods of the present invention are further understood to include the protecting of equipment, e.g., industrial equipment, from the same scale build up and/or soiling and provide increased cleaning efficacy through the application of the softened acidic water to a surface in need of treatment. Each of the same methods are also effective in reducing the use of conventional detersive compositions as a result of the acidic softened water; and/or reducing the need for specific chemistries, e.g., those containing threshold agents, chelating agents, or sequestrants, or phosphorous, in downstream cleaning processes.

The methods as disclosed herein may include contacting a water treatment composition (e.g. acid regenerated resin material) with a water source, namely a hard water source.

In some embodiments, the water treatment composition is contained within a treatment reservoir and/or a water preparation system. The step of contacting can include, but is not limited to, running the water source over or through the water treatment composition (e.g. ion exchange resin). As one skilled in the art will ascertain, the contact time for the water source is dependent on a variety of factors, including, for example, the pH of the water source, the hardness of the water source, and the temperature of the water source.

A water source may be applied (i.e. water source contacted with the resin) at a variety of flow rates, as one of skill in the art can apply without undue experimentation. For example, in preferred embodiments the flow rate through the systems of the invention is from about 0.5 to about 50 gallons per minute. In other embodiments the flow rate is less than about 8 gallons per minute, less than about 40 gallons per minute, less than about 100 gallons per minute, less than about 200 gallons per minute, or from about 100 to about 1500 gallons per minute, from about 160 to about 1400 gallons per minute, or about 400 to about 1200 gallons per minute. For further example, in some embodiments, the apparatuses of the present invention have a flow through rate of about less than about 1 cubic feet per minute, less than about 5 to about 200 cubic feet per minute, about 20 to about 175 cubic feet per minute, or about 50 to about 150 cubic feet per minute. Without being limited according to the invention, all flow rate ranges recited are inclusive of the numbers defining the range and include each integer within the defined range.

For further example, a conventional ion exchange device is designed for a flow rate of about 0.3 to about 3.0 feet per minute of water velocity. This flow rate is important to allow time for the diffusion of ions to the surface of the resin from the water for the ion exchange process to occur. Without being limited according to the invention, all flow rates ranges recited are inclusive of the numbers defining the range and include each integer within the defined range.

Optionally, in some embodiments, the method includes heating the water source prior to the step of contacting the water treatment composition (e.g. resin). Any means of heating the water source may be used with the methods and apparatuses of the present invention. In some embodiments, the water is heated to a temperature of about 30° C. to about 100° C. All temperature ranges recited are inclusive of the numbers defining the range and include each integer within the defined range.

In some aspects the water treatment according to the invention provides a cold, hard water source to a water preparation system. After contacting the water source with the water treatment composition (e.g. resin) and heating, a treated, soft, acidic water is obtained and may be applied to the various applications of use disclosed herein. Although not intending to be bound to any particular theory of the invention, protons from the resin (e.g. H$^+$ from the carboxylic acid group on the weak acid ion exchange resin) are exchanged with water hardness ions in the water source to provide the treated, soft, acidic water.

Preferably the controlling of water hardness and producing an acidic softened water source according to the invention result in a treated water source having a pH less than about 7, more preferably less than about 6. Without being limited according to the invention, all pH ranges recited are inclusive of the numbers defining the range and include each integer within the defined range.

The treated water source preferably has a water hardness less than about 3 grains, more preferably less than about 2 grains, more preferably less than about 1 grain, and still more preferably about 0 grains. Without being limited according to the invention, all ranges of water hardness recited are inclusive of the numbers defining the range and include each integer within the defined range.

The treated water source preferably has a low total dissolved solids (TDS) of at least less than 200 ppm, preferably less than 100 ppm and still more preferably less than 50 ppm. Without being limited according to the invention, all ranges of TDS are inclusive of the numbers defining the range and include each integer within the defined range. According to the methods of the invention the resin of the water treatment composition may be contacted with the water source until a point of exhaustion, viz. loaded with a plurality of multivalent hardness cations as a result of having a sufficient amount of water source run over it. In some embodiments, the plurality of multivalent cations includes, but is not limited to, the calcium and magnesium present in the water source. Without wishing to be bound by any particular theory, it is thought that as the water runs over the resin, the calcium and magnesium ions in the water will attach to the resin, displacing protons into the treated water source creating an acidic softened water.

At the point the resin is exhausted, e.g. can no longer exchange protons with the water hardness ions of the water source, the resin is regenerated according to the methods disclosed herein. According to the invention, the ion exchange resin is regenerated using an acid, namely an acid regenerant. According to the invention, the acid regenerant provides protons to the resin to restore capacity to soften and acidify water in need of treatment according to the invention. In an aspect, the acid regenerant is a strong mineral acid or an acid salt. A preferred embodiment for regenerating the ion exchange resin uses urea sulfate as the acid regenerant.

The contacting of the exhausted resin with the acid regenerant may be from a few minutes to about 90 minutes, preferably from about one minute to about 60 minutes, and more preferably from about 5 minutes to about 30 minutes. Without being limited according to the invention, all ranges are inclusive of the numbers defining the range and include each integer within the defined range.

According to the methods of the invention, the effluent water in the regeneration step may be disposed of in a waste stream. However, thereafter, the effluent water (e.g. treated water) in the normal service cycle is again acidic softened water and can be used according to the various methods disclosed herein.

The regeneration of the resins according to the invention may occur based on measurements obtained from the apparatus and/or systems of the invention. In an alternative embodiment, regeneration of the resins according to the invention may occur based on the lapse of a measured amount of time and/or volume of water treated.

Methods to Trigger Events Using the Acidic Softened Water

The methods, apparatuses and/or systems of the invention may be used for a variety of purposes. For example, the generation of the acidic softened water according to the invention may be used to trigger different events in a water preparation system or other apparatus or system. In particular, the protons generated from the exchange of hardness ions onto the resin may be monitored or measured to trigger different events in the water preparation system, other apparatuses and/or systems according to the invention.

The measurements and/or monitoring according to the invention are distinct from various commercial sensors for detecting changes and/or measuring water hardness in a system. For example, U.S. Pat. No. 7,651,663 entitled, "Appliance Using a Water Hardness Sensor System and Method of Operating the Same", incorporated herein by reference in its entirety, measures water hardness according to the amount of hardness ions (e.g. $Ca^{2+}$, $Mg^{2+}$) in a water source. According to the invention, the methods, apparatuses and/or systems do not measure water hardness. As opposed to these types of calorimetric or fluorescent assays measuring the concentrations of ions such as calcium and magnesium, the present invention measures the output and/or effluent from a water treatment system, measuring the proton released from the ion exchange resin.

In some aspects, the monitoring or measuring of the protons is achieved by conventional pH measurements measurement of the output from the water preparation system or other apparatuses or systems of the invention. Sensors can be used to measure the pH as one example of a suitable measuring device. According to additional embodiments, the monitoring or measuring device to measure the pH can be employed through the use of electrodes, reference electrodes and/or solid state devices to sense pH. For example a pH measurement loop can be employed, such as a pH sensor, including a measuring electrode, a reference electrode and a sensor, a preamplifier and an analyzer or transmitter. Each of these are examples of suitable measuring devices according to the invention.

In additional aspects, the pH of an incoming (e.g. non-treated) water source containing hardness ions can be compared to the treated acidic softened water exiting the water preparation system, other apparatuses and/or system according to the invention. In such an embodiment, the pH differential can be used for a variety of purposes, including monitoring a working system. In an embodiment, the measuring of pH differential would detect a decrease in pH differential, triggering an applicable event, such as regeneration of the ion exchange resin, adding detergent and/or rinse additives or other cleaning agents to be used with the treated water. Measuring the pH differential is often useful as a result of the variability of water hardness depending upon a water source employed, as it is well known that hardness levels in influent waters are not constant. Therefore, as a result of methods of the invention employing the measurement of pH differential, variations in water hardness will not be detrimental to a use application as a result of the apparatuses and/or systems being able to monitor and adjust for such differential (e.g. through the triggering of various events as disclosed herein).

The regeneration of the ion exchange resins disclosed herein can be triggered by a variety of events and/or measurements as disclosed herein. In an aspect, the regeneration of the ion exchange resin may be triggered by the measurement of TDS in a system, which shall be dependent on the particular water chemistry inputted to the system. For example, in an aspect of the invention, the ion exchange resins remove from about 70% to about 100% TDS from the water source. In a preferred aspect, the ion exchange resins remove from about 80% to about 100% TDS, or from about 90% to about 100% TDS from the water source. Therefore, in the event the removal of TDS from a treated water source drops below about 70%, or about 80%, or about 90%, such measurement in the differential of the TDS between the untreated water and the treated water source may trigger the regeneration of the ion exchange resins.

In an additional aspect, the regeneration of the ion exchange resins may be triggered by pH measurement of the water source and/or the treated water. For example, the increase in pH of a treated water source above about 7 may trigger the regeneration of the ion exchange resins. Without being limited to a particular theory of the invention, the ion exchange resin may be exhausted between a pH of about 4.9 to about 5, therefore when the pH of the treated water source increases to about 7, or above 7 the ion exchange resin no longer contributes protons from the resin to acidify and soften the water source. Accordingly, the regeneration of the ion exchange resin is triggered.

One skilled in the art is knowledgeable of the various means for monitoring and/or measuring the pH according to the methods of triggering events using the acidic softened water disclosed herein. Therefore, the scope of the invention is not limited according to the methods for monitoring and/or measuring. Conventional measuring techniques include the use of sensors. Preferably a sensor is configured to output a signal to a controller. The sensor may include a substrate and a sensing element disposed on the substrate. The sensing element is in contact with the flow of water in the apparatus and/or system; preferably the sensing element in contact with both the flow of incoming (e.g. non-treated) water and effluent (e.g. treated acidic softened) water.

Events triggered according to use of the apparatuses and/or systems and/or methods according to the invention include, for example: dispensing of detergents, rinse aids and/or other cleaning compositions; varying the detergent consumption needed to wash or rinse a surface according to the methods of the invention; regeneration of the ion exchange resins; starting and/or stopping the generation of treated water disclosed herein, etc. The triggering of events is initiated through the measurement step, thereafter communicating with a controller to receive a signal. Thereafter, the controller works to trigger the desired event for an apparatus and/or system according to the invention.

Methods Employing the Acidic Softened Water

The methods, apparatuses and/or systems of the invention may be used for a variety of cleaning applications to employ the acidic softened water, including use of the treated acidic water to generate cleaning compositions. Thus, an apparatus of the present invention can be used to control water hardness and/or reduce scale formation and/or enhancing cleaning efficiency and/or reduce spotting and filming caused by high TDS waters and/or reduce or eliminate use of additional chemistry streams for cleaning (e.g. polymers, threshold agents, etc.). Unexpectedly, according to the invention, the protons in the acidic softened water contribute to the performance of the treated water source.

The systems of the present invention and the methods employing the same can be included as part of any system or appliance which uses a water source and is in need of water treatment, e.g., acidification and/or softening using a water treatment system. In particular, the systems and apparatuses of the present invention can be used with any appliance or device which can provide a water source that would benefit from treatment using the apparatuses of the present invention, including either or both of acidification and/or softening.

In some aspects, the present disclosure includes methods of using the acidic softened water for low-temperature ware washing and sanitizing. The treated acidic water may be provided to an automatic washing machine from the treated water delivery line of the apparatuses and/or systems. The apparatus can be located in a variety of locations relative to the washing machine. For example, the apparatus may be upstream from the feed line of the washing machine. Exemplary automatic washing machines suitable for use with the apparatuses and methods of the present invention include, but are not limited to, an automatic ware washing machine, a vehicle washing system, an instrument washer, a clean in place system, a food processing cleaning system, a bottle washer, and an automatic laundry washing machine. Alternatively, the treated water may be used in a manual washing system. Any automatic washing machine or manual washing process that would benefit from the use of water treated in accordance with the methods of the present invention can be used.

In some aspects, the present disclosure includes methods of using the acidic softened water for ware washing applications, including those disclosed for example in various ware washing applications using acid formulations, including U.S. Pat. Nos. 8,114,222, 8,092,613, 7,942,980, and 7,415,983, U.S. patent application Ser. No. 13/474,771, Ser. No. 13/474,765, Ser. No. 13/474,780 and Ser. No. 13/112,412, including all references cited therein, which are herein incorporated by reference in their entirety. A particularly suitable application for use of the treated acidic water is for use in an acidic rinse cycle. For example, the treated acidic water may be dispensed with additional acidic compositions through a rinse arm, without or without an additional water rinse step, in order to lower the pH in the final rinse. In an additional application of use, the treated acidic water may be used in an alternating fashion with alkaline detergents and steps to improve soil removal.

In some aspects, non-limiting example of dish machines suitable for using the systems of the invention for water conditioning and/or a source of cleaning and/or rinsing waters are disclosed, for example, in U.S. patent application Ser. No. 13/712,329, entitled Dishmachine, the entire contents of which are hereby expressly incorporated herein by reference. Further examples of dish machines suitable for employing the treated acidic water disclosed herein, includes, U.S. Pat. Nos. 8,202,373, 8,092,613, 7,942,978, 7,871,521, 5,609,174, 4,826,661, 4,690,305, 4,687,121, 4,426,362 and in U.S. Pat. Nos. Reissue 32,763 and 32,818, the entire contents of which are hereby expressly incorporated herein by reference. Some non-limiting examples of dish machines include door machines or hood machines, conveyor machines, undercounter machines, glasswashers, flight machines, pot and pan machines, utensil washers, and consumer dish machines. The dish machines may be either single tank or multi-tank machines.

A door dish machine, also called a hood dish machine, refers to a commercial dish machine wherein the soiled dishes are placed on a rack and the rack is then moved into the dish machine. Door dish machines clean one or two racks at a time. In such machines, the rack is stationary and the wash and rinse arms move. A door machine includes two sets arms, a set of wash arms and a rinse arm, or a set of rinse arms. Door machines may be a high temperature or low temperature machine. In a high temperature machine the dishes are sanitized by hot water. In a low temperature machine the dishes are sanitized by the chemical sanitizer. The door machine may either be a recirculation machine or a dump and fill machine. In a recirculation machine, the detergent solution is reused, or "recirculated" between wash cycles. The concentration of the detergent solution is adjusted between wash cycles so that an adequate concentration is maintained. In a dump and fill machine, the wash solution is not reused between wash cycles. New detergent solution is added before the next wash cycle. Some non-limiting examples of door machines include the Ecolab Omega HT, the Hobart AM-14, the Ecolab ES-2000, the Hobart LT-1, the CMA EVA-200, American Dish Service L-3DW and HT-25, the Autochlor A5, the Champion D-HB, and the Jackson Tempstar.

The temperature of the cleaning applications in ware wash machines according to the invention may also vary depending on the dish machine, for example if the dish machine is a consumer dish machine or an institutional dish machine. The temperature of the cleaning solution in a consumer dish machine is typically about 110° F. (43° C.) to about 150° F. (66° C.) with a rinse up to about 160° F. (71° C.). The temperature of the cleaning solution in a high temperature institutional dish machine in the U.S. is about typically about 150° F. (66° C.) to about 165° F. (74° C.) with a rinse from about 180° F. (82° C.) to about 195° F. (91° C.). The temperature in a low temperature institutional dish machine in the U.S. is typically about 120° F. (49° C.) to about 140° F. (60° C.). Low temperature dish machines usually include at least a thirty second rinse with a sanitizing solution. The temperature in a high temperature institutional dish machine in Asia is typically from about 131° F. (55° C.) to about 136° F. (58° C.) with a final rinse at 180° F. (82° C.).

The disclosed methods of using the acidic softened water may also be used in a pot and pan washer, a utensil washer, glasswashers and/or a conveyor machine. A conveyor machine refers to a commercial dish machine, wherein the soiled dishes are placed on a rack that moves through a dish machine on a conveyor. A conveyor machine continuously cleans racks of soiled dishes instead of one rack at a time. Here the manifolds are typically stationary or oscillating and the rack moves through the machine. A conveyor machine may be a single tank or multi-tank machine. The conveyor machine may include a prewash section. A conveyor machine may be a high temperature or low temperature machine. Finally, conveyor machines primarily recirculate the detergent solution. Some non-limiting examples of conveyor machines include the Ecolab ES-4400, the Jackson AJ-100, the Stero SCT-44, and the Hobart C-44, and C-66.

In some embodiments, the dish or ware machine can incorporate an acid regenerate-able ion exchange resin system at a point of use. Beneficially, the use of the acid regenerate-able ion exchange resin system at a point of use avoids the need for an extra, external, water conditioning system. Further benefits result from the use of the system at a point of use is that the demands on the water within the facility or location are associated with the particular dish or other machine, instead of the rest of the water used in the facility.

In additional aspects, the present disclosure includes methods of using the acidic softened water for laundry applications. For example, the acidic treated water can be used in an automatic textile washing machine at the pre-treatment, washing, souring, softening, and/or rinsing stages. In a particular embodiment, the present invention may be used with a washing machine in a variety of ways. In some embodiments, a treatment reservoir housing the ion exchange resin may be connected to a laundry detergent dispensing device. The treatment reservoir may be used to supply treated water to a washing system and/or to a rinsing system of a laundry washing machine. In some embodiments, the treatment reservoir may be used to supply a mixture of treated water and detergent to a laundry washing system.

In still additional aspects, the present disclosure includes methods of using the acidic softened water in a variety of additional industrial and domestic applications. For example, according to embodiments of the invention the acidic softened water can be delivered to a variety of cleaning applications through the use of dilution systems, which may include for example an aspirator or other pump that feeds into a cleaning system.

The water treatment methods and apparatuses can be employed in a residential setting or in a commercial setting, e.g., in a restaurant, hotel, hospital. In addition to the ware washing (e.g., washing eating and cooking utensils and dishes) and laundry applications, for example, a water treatment method, system, or apparatus of the present invention can be used in: other hard surfaces such as showers, sinks, toilets, bathtubs, countertops, windows, mirrors, and floors; in vehicle care applications, e.g., to treat water used for pre-rinsing, e.g., an alkaline presoak and/or low pH presoak, washing, polishing, and rinsing a vehicle; industrial applications, e.g., cooling towers, boilers, industrial equipment including heat exchangers; in food service applications, e.g., to treat water lines for coffee, espresso and tea brewers, espresso machines, ice machines, pasta cookers, water heaters, booster heaters, steam tables, grocery mister, steamers and/or proofers; in healthcare instrument care applications, e.g., soaking, cleaning, and/or rinsing surgical instruments, treating feed water to autoclave sterilizers; and in feed water for various applications such as humidifiers, hot tubs, and swimming pools. In some embodiments, an apparatus of the present invention can be used to treat water provided to an ice machine.

Additional hard surface cleaning applications for the treated acidic water source include clean-in-place systems (CIP), clean-out-of-place systems (COP), automatic bottle washers, washer-decontaminators, sterilizers, textile laundry machines, ultra and nano-filtration systems and indoor air filters. CIP systems include the internal components of tanks, lines, pumps and other process equipment used for processing typically liquid product streams such as beverages, milk, juices. COP systems can include readily accessible systems including wash tanks, soaking vessels, mop buckets, holding tanks, scrub sinks, vehicle parts washers, non-continuous batch washers and systems, and the like.

In additional aspects, use of a treated acidic water source according to the invention reduces or eliminates use of additional chemistry streams for cleaning (e.g. polymers, threshold agents, etc.). Preferably, use of a treated acidic water source according to the invention allows for the use of specific environmentally friendly detersive compositions, e.g., those substantially free of or free of builders, chelants, sequestrants and/or phosphorous.

The various methods of use employing the acidic softened water according to the invention may be used in combination with any detersive compositions. For example, a cleaning composition, a rinse agent composition and/or a drying agent composition can be combined with treated water to form a use solution. The articles to be cleaned and/or rinsed are then contacted with the use solution. Exemplary detergent compositions include ware washing detergent compositions, laundry detergent compositions, CIP detergent compositions, environmental cleaning compositions, hard surface cleaning compositions (such as those for use on counters or floors), motor vehicle washing compositions, and glass cleaning compositions. Exemplary rinse agent compositions include those compositions used to reduce streaking or filming on a surface such as glass. Exemplary drying agent compositions include dewatering compositions. In the vehicle washing industry, it is often desirable to include a dewatering step where a sheeting or beading agent is applied to the vehicle exterior.

However, according to a preferred embodiment the use of the treated acidic water reduces and/or eliminates the need for additional cleaning compositions (e.g. polymers, threshold agents, etc.) and/or reduces the overall detergent consumption due to the increased cleaning efficacy of the treated water. Therefore, in some embodiments, the detersive composition for use with the methods of the present invention includes a detergent that is substantially free of a chelant, builder, sequestrant, and/or threshold agent, e.g., an aminocarboxylic acid, a condensed phosphate, a phosphonate, a polyacrylate, or the like. Without wishing to be bound by any particular theory, it is thought that because the methods and apparatus of the present invention reduce the negative effects of hardness ions in the water source, when used with a detergent, there is a substantially reduced or eliminated need to include chelating agents, builders, sequestrants, or threshold agents in the detergent composition in order to handle the hardness ions.

For example, use of a water source treated in accordance with the methods of the present invention increases the efficacy of conventional detergents. It is known that hardness ions combine with soap and detergents to form a scale or scum. Further, hardness ions limit the amount of lather formed with soaps and detergents. Without wishing to be bound by any particular theory, it is thought that by reducing the amount of these hardness ions the amount of these detrimental side effects can be reduced.

In some embodiments of use, there is a substantial reduction in the detergent consumption as a result of the use of the treated acidic water source for the cleaning application, including for example, at least a 5% detergent consumption reduction, at least a 10% detergent consumption reduction, at least a 20% detergent consumption reduction, or at least a 25-30% detergent consumption reduction. Without being limited according to the invention, all percentages of detergent consumption reduction ranges recited are inclusive of the numbers defining the range and include each integer within the defined range.

As one skilled in the art will ascertain, in some embodiments, the detersive composition may include other additives, including conventional additives such as bleaching agents, hardening agents or solubility modifiers, defoamers, anti-redeposition agents, threshold agents, stabilizers, dispersants, enzymes, surfactants, aesthetic enhancing agents (i.e., dye, perfume), and the like. Adjuvants and other additive ingredients will vary according to the type of composition being manufactured. It should be understood that these additives are optional and need not be included in the cleaning composition. When they are included, they can be included in an amount that provides for the effectiveness of the particular type of component.

In an aspect, the water conditioning units are employed for treating a portion of a facility's water. Various conditions associated with treating a portion of a facility's water are disclosed for example in U.S. patent application Ser. Nos. 12/764,621, 12/764,606, and 12/114,448, which are herein incorporated by reference in their entirety.

In a preferred aspect, the water conditioning units are employed to condition water specifically used for a chemical dispenser of a cleaning composition, e.g. a housekeeping cleaning dispenser for generating a use solution of a cleaning composition. In a further aspect, the water conditioning units are associated with a chemical concentrate dispenser, including for example, association or connection by plumbing and/or proximity of location. In an exemplary embodiment, the water conditioning unit may be connected to the water main of a facility (e.g. house or business), such as may be further connect to a chemical concentrate dispenser.

In an aspect, the methods of the invention provide for an improved means of water conditioning to replace conventional means of filtration, including for example point-of-use filtration for a water source. Instead, according to embodiments of the invention, an acid regenerate-able cation exchange resin is employed to provide a treated, softened, acidic water source for uses as disclosed herein.

In some aspects, the use of softened acidic water for a dilution source for a cleaning composition is particularly well suited for cleaning and/or sanitizing applications, including for example, for use in housekeeping, laundry, ware washing, disinfectant applications (namely housekeeping and/or hospital or other healthcare applications), any hard surface cleaning application, and the like. In a particular aspect, the use of softened acidic water for a dilution source for a cleaning composition is particularly well suited for glass cleaning applications, including for example exterior window surfaces of buildings. Beneficially, in some aspects, the treated acidified water according to the invention can be used for glass cleaning by itself or with other cleaning components in a cleaning composition.

In some embodiments, treated water can be combined with a detersive or other cleaning composition and the combination provided to a surface in need of treatment, a washing machine and/or other cleaning application as a use solution. Use of a treated water source has many advantages in downstream cleaning processes compared to use of a non-treated water source. For example, use of the softened acidic water source treated in accordance with the methods of the present invention increases the efficacy of conventional detergents. It is known that hardness ions combine with soap and detergents to form a scale or scum. Further, hardness ions limit the amount of lather formed with soaps and detergents. Without wishing to be bound by any particular theory, it is thought that by reducing the amount of these hardness ions the amount of these detrimental side effects can be reduced.

Any detersive or cleaning composition can be used with water treated according to the present invention. For example, a cleaning composition, a rinse agent composition or a drying agent composition can be combined with treated water to form a use solution. The articles to be cleaned and/or rinsed are then contacted with the use solution. Exemplary detergent compositions include warewashing detergent compositions, laundry detergent compositions, CIP detergent compositions, environmental cleaning compositions, hard surface cleaning compositions (such as those for use on counters or floors), and glass cleaning compositions. Exemplary rinse agent compositions include those compositions used to reduce streaking or filming on a surface such as glass. Exemplary drying agent compositions include dewatering compositions.

Further, in an optional aspect, the use of the softened acidic treated water source according to embodiments of the invention allows for the use of specific environmentally friendly detersive compositions, e.g., those substantially free of or free of builders, chelants, or sequestrants, or phosphorous.

In an aspect of the invention, a high quality, softened, low TDS water source is generated for use in diluting a cleaning (or other) composition at a point of use. For example, in the housekeeping industry, a cleaning composition (e.g. all-purpose cleaner, cleaner and/or degreaser, glass cleaner, shower cleaner and/or air freshener) is provided as a concentrate and diluted using a dispenser at a user facility and/or point of use. In a preferred embodiment, an effluent treated water source from the water conditioning unit is an acidic softened water used for glass cleaning applications.

In an aspect, the dispenser dilutes the concentrate composition (e.g. cleaning composition) at a set ratio or proportion with the facilities water. Examples of conventional types of dispensing include for example, aspirators, pumps, gravity feed, etc. Regardless of the dispensing apparatus, a user identifies a specific dilution ratio for the cleaning composition using a source of water, e.g. the treated acidic water according to the invention. Examples of commercially-available systems include Oasis, Oasis Pro, QC and Quik Fill (Ecolab® Inc.). Additional description of suitable systems is disclosed, for example, in U.S. Pat. Nos. 6,158,486, 5,651,398, 6,079,595, and 5,915,592, which are herein incorporated by reference in their entirety. Beneficially, according to the invention, the use of any commercially-available dispensing system employed in combination with the treated acidic water overcomes a significant drawback of conventional approaches, i.e. lack of control over the water quality used to dilute a cleaning composition.

In an aspect, the use of the high quality, softened, low TDS water source for a dispensing system to generate a cleaning composition provides improved water quality over a facility's untreated water source. In an aspect, a treated water source has a reliable, predictable and regenerate-able specification for use in combination with cleaning compositions.

In yet a further aspect, the methods of the invention include contacting a surface in need of cleaning with a cleaning composition use solution employing a softened acidic water source. Beneficially, the methods of the invention provide for use of an improved water quality for cleaning (e.g. glass cleaning) applications as a result of using the treated water from an acid regenerate-able ion exchange resins water conditioning unit. The improved cleaning includes, for example, significantly reduced spotting and filming on a treated surface (e.g. glass).

In a further aspect, the methods of the invention further include reducing polymer (e.g. water conditioning agents) and/or threshold reagents required in a cleaning composition (e.g. detergent) as a result of using the softened acidic water generated by acid regenerate-able ion exchange resins according to the invention. In addition, the methods of the invention further obviate the need for reverse osmosis purified water for cleaning compositions.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. The contents of all references, patents, and patent applications cited throughout this application are hereby incorporated by reference. The invention is further illustrated by the following examples, which should not be construed as further limiting.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Previous experiments show that ware washing results will be improved using softened water by conventional means and acidified by consumable detergents and/or rinse additives. When conventional ion exchange resins are exhausted, the water is no longer softened and brine is typically used to regenerate the resin. The water that is no longer softened often causes poor washing results unless additional detergents concentration containing builders, chelants or polymers are increased and additional rinse additive is used.

An experiment showing the proof of scale build up on ware was conducted using a carbonate 500 ppm, 75 cycle test. Table 1 quantifies the results of ware treated according to the experiment, wherein Glasses 1A were treated using only hard water (17 Grain/Gal hardness water) and Glasses 1B were treated using the acidic softened water according to the invention. The resultant scale build up on the treated ware surfaces were depicted by photograph and measured visually according to the grading scale (below).

The 75 cycle test employed was performed using six 10 oz. Libbey glasses and four plastic tumblers (SAN=Styrene Acrylonitrile) on a Hobart AM-14 ware wash machine and 17 grain water (1 grain=17 ppm). The specifications of the Hobart AM-14 ware wash machine include: Washbath volume: 60 L; Rinse volume: 4.5 L; Wash time: 40 sec.; Rinse time: 9 sec.

Initially the glasses were cleaned according to procedures ensuring removal of all film and foreign material from the glass surface. The 75 cycle test was initiated. After the completion of each cycle, the machine is appropriately dosed (automatically) to maintain the initial concentration. Glasses and tumbles dry overnight and then are graded for film accumulation using a strong light source. (1—No film; 2—Trace film; 3—Light film; 4—Medium film; 5—Heavy film). As shown in Table 1, Glasses 1A (hard water—17 grain) were graded a level 5, demonstrating heavy film. The glasses treated according to the invention shown in Glasses 1B (acidic softened water) were graded a level 1, demonstrating no film.

TABLE 1

| | Evaluated Glasses | |
|---|---|---|
| | 1A | 1B |
| Film Accumulation | 5 | 1 |

Example 2

An experiment showing the proof of protein removal on ware was conducted using the detergent APEXNC 1000 ppm (Ecolab®) and the 7 cycles protein removal test. Table 2 show the results of ware treated according to the experiment, wherein Glasses 2A were treated using only hard water (5 Grain/Gal hardness water) and Glasses 2B were treated using the acidic softened water according to the invention. The resultant scale build up on the treated ware surfaces are depicted by photograph and measured visually according to the grading scale (below).

The 7 cycle protein test employed was performed to provide a generic method for evaluating glass filming, spotting, and soil removal in an institutional dish machine. Clean test glasses are washed in an institutional dish machine. The performance of the detergent or rinse aid is measured by the prevention of water spotting or filming and the removal of soil from plastic tumblers and Libbey Glass tumblers. According to this experimentation the performance of use of softened acid water (as opposed to 5 grain hard water) were evaluated.

Clean Libbey glasses were used for each test product and new plastic tumblers were used for each experiment. Food soils were prepared food soils. The dish machine was filled with the tested water sources (described according to Glasses 2A-2B) and heaters were turned on. The final rinse temperature was adjusted to 180° F. for the high temperature machines. Glasses and plastic tumblers were soiled and placed in the oven at 160° F. for 8 minutes. While glasses were drying, the ware wash machine was primed with 120 g of soil previously prepared (corresponding to 2000 ppm of food soil in the sump). Soiled glasses/plastic tumblers are placed in the rack beside the re-deposition glasses/plastic tumblers. The wash machine is started and glasses are run through an automatic cycle. When the cycle has ended, the top of the glasses are mopped with a dry towel. The soiling procedure is repeated. At the beginning of each cycle, the appropriate amount of detergent and food soil are added to the wash tank to make up for the rinse dilution. The steps are repeated until seven cycles are complete.

Results were evaluated using the de-staining methods employing a Coomassie Blue R Stain solution to evaluate glasses visually against a while background. Glasses are first stained using the Coomassie Blue R Stain solution and rinsed thoroughly with de-staining solution (methanol and acetic acid in distilled water). Each glass is then visually rated in a viewing area against a white background, wherein residual protein remains stained blue. (1—No protein; 2—20% of glass surface covered in protein; 3—40% of glass surface covered in protein; 4—60% of glass surface covered in protein; 5—greater than 80% of glass surface covered in protein. As shown in Table 2 the Glasses 2A (hard water—5 grain) were graded a level 2, demonstrating 20% of glass surface covered in protein. The glasses treated according to the invention shown in Glasses 2B (acidic softened water) were graded a level 1, demonstrating no protein on the glasses.

TABLE 2

| | Evaluated Glasses | |
|---|---|---|
| | 2A | 2B |
| Film Accumulation | 2 | 1 |

Example 3

The capacity of a commercially-available weak acid resin against pH of water was tested. An Amberlite® IRC 76 ion exchange resin (commercially-available from Rohm and Haas Company) was tested. Amberlite® IRC 76 ion exchange resin is one example of a commercially-available weak acidic resin having a polyacrylic copolymer with carboxylic acid functional group. This particular resin is characterized by a volume variation smaller than conventional weak acid resins and can be used in $H^+$, $Na^+$ or $NH_4^+$ forms and can also be used to remove bicarbonate hardness from water. The resin is known to be sensitive to chlorine in water (affecting the lifetime and performance of the resin). The operating capacity of the resin is a function of analysis, temperature and service flow rate of water. The resin is readily regenerated with little over stoichiometric amounts of strong acids.

On average, the use of a conventional weak acid resin used in ion exchange water softening applications are designed for bed depths of 2.6 feet for water treatment rates of about 2 to about 20 gallons per minute. However, one skilled in the art may vary the water treatment rates, including for example from about 0.5 to about 50 gallons per minute. The configuration used for the testing of the capacity of the ion exchange resin used a flow rate of about 5-10 gallons of water per minute and consumed less than 1 cubic foot of resin for the system. In addition, various monitoring devices were in use within the system to measure flow, water hardness (e.g. hardness ions measured by titration method), pressure within the system (e.g. measurement of presume required for effective rinsing, preferably pressure measurement of about 20 psi), pH of the effluent (e.g. electrode measurement), and TDS (e.g. ICP analytical method for TDS).

Figure 6:
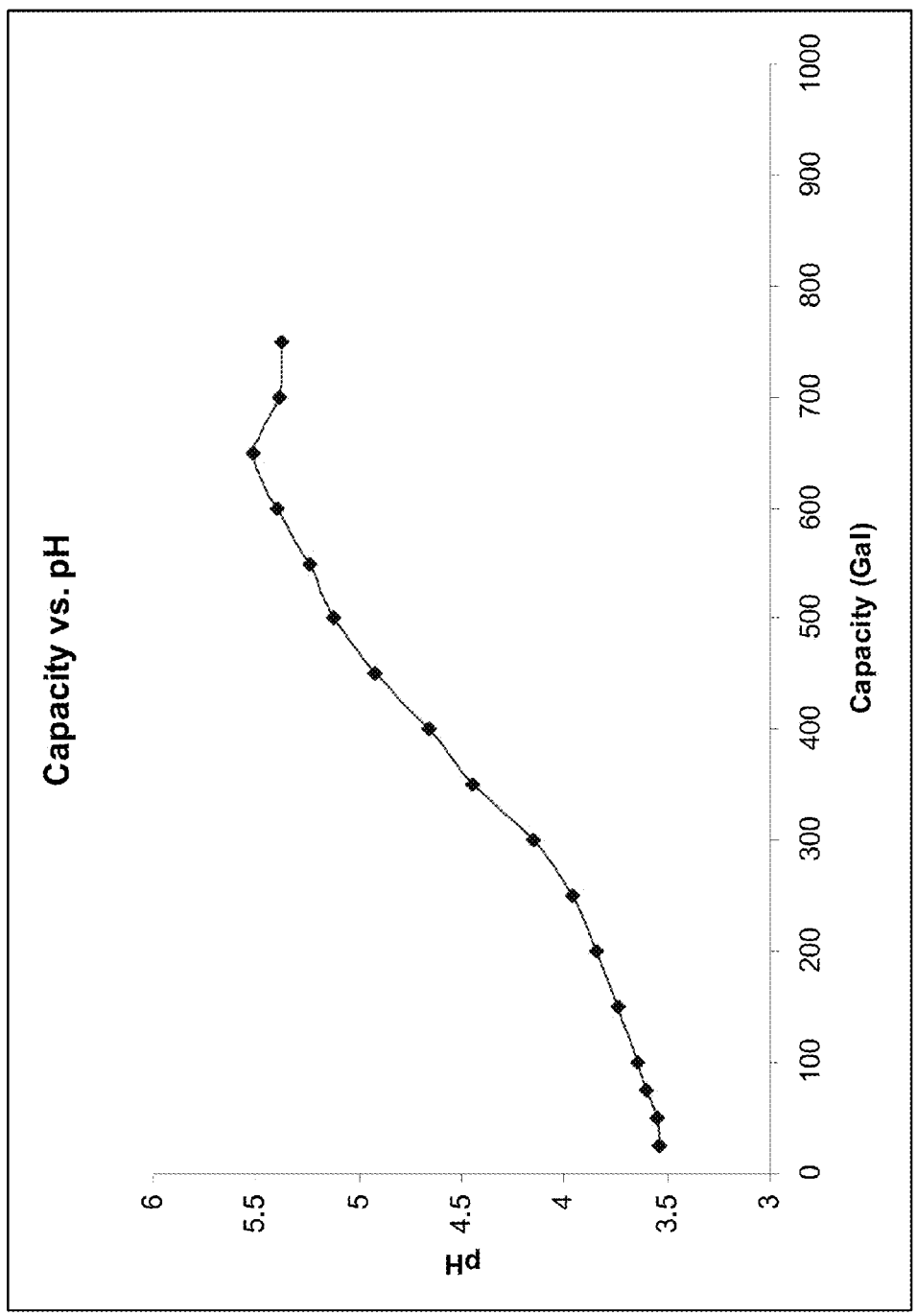
FIG. 6 shows a diagram of the capacity of an acid regenerated ion exchange resin v. pH of treated water according to an embodiment of the invention.

FIG. 6 shows a diagram of the capacity of an acid regenerated ion exchange resin v. pH of treated water according to an embodiment of the invention. The best results are obtained from the resin with a pH less than about 6. Preferably the pH is less than about 7.

Example 4

The capacity of a commercially available weak acid resin against hardness of water was tested. An Amberlite® IRC 76 ion exchange resin (commercially-available from Rohm and Haas Company) was tested. Amberlite® IRC 76 ion exchange resin is one example of a commercially-available weak acidic resin having a polyacrylic copolymer with carboxylic acid functional group. This particular resin is characterized by a volume variation smaller than conventional weak acid resins and can be used in $H^+$, $Na^+$ or $NH_4^+$ forms and can also be used to remove bicarbonate hardness from water. The resin is known to be sensitive to chlorine in water (affecting the lifetime and performance of the resin). The operating capacity of the resin is a function of analysis, temperature and service flow rate of water. The resin is readily regenerated with little over stoichiometric amounts of strong acids.

The configuration used for the testing of the capacity of the ion exchange resin used a flow rate of about 5-10 gallons of water per minute and consumed less than 1 cubic foot of resin for the system. In addition, various monitoring devices were in use within the system to measure flow, water hardness (e.g. hardness ions measured by titration method), pressure within the system (e.g. measurement of presume required for effective rinsing, preferably pressure measurement of about 20 psi), pH of the effluent (e.g. electrode measurement), and TDS (e.g. ICP analytical method for TDS).

Figure 7:
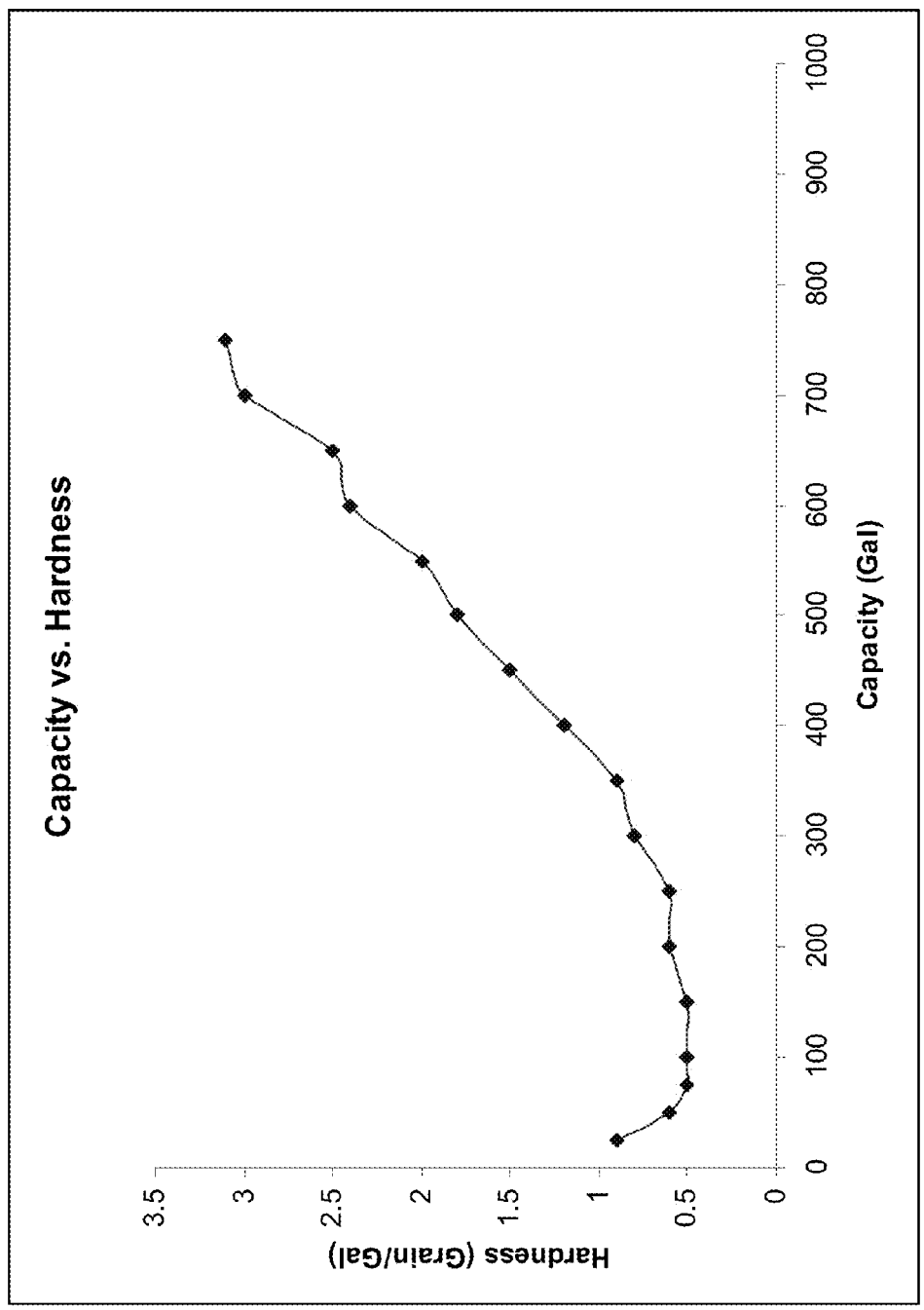
FIG. 7 shows a diagram of the capacity of an acid regenerated ion exchange resin v. water hardness of treated water according to an embodiment of the invention.

FIG. 7 shows a diagram of the capacity of an acid regenerated ion exchange resin v. water hardness of treated water according to an embodiment of the invention. The best results are obtained from the resin system with a water hardness less than about 2 grains.

Example 5

Layered resin bed systems were evaluated to assess the impact on treated water hardness using more than one acid cation exchange resin. 4710 grams of the Dowex® MAC-3 weak cation exchange resins (commercially-available from Dow Chemical Company) were used to form a layered bed using two of the weak acid cation exchange resins, such as shown in FIG. 3A. The Dowex® MAC-3 LB resin is one example of a commercially-available weak acidic resin having a carboxylic acid functional groups. The MAC-3 WAC resins were packed into two connected 19 inch by 5 inch diameter housing tubes. 3575 grams of the Dowex® MAC-3 weak cation exchange resin (commercially-available from Dow Chemical Company) and 1235 grams of Dowex® Marathon-C(H form) strong cation exchange resin (commercially-available from Dow Chemical Company) were used to form a mixed layered bed, such as shown in FIG. 3B. The cation exchange resins were packed into two connected 19 inch by 5 inch diameter housing tubes.

Hard water (17 grains) was provided to the layered resin bed systems depicted in FIGS. 3A-3B at a controlled rate of about 0.8 gallons per minute. The water from the outlet of the second treatment reservoir was measured for both hardness and pH. Water samples were taken to test pH levels against capacity.

Figure 8:
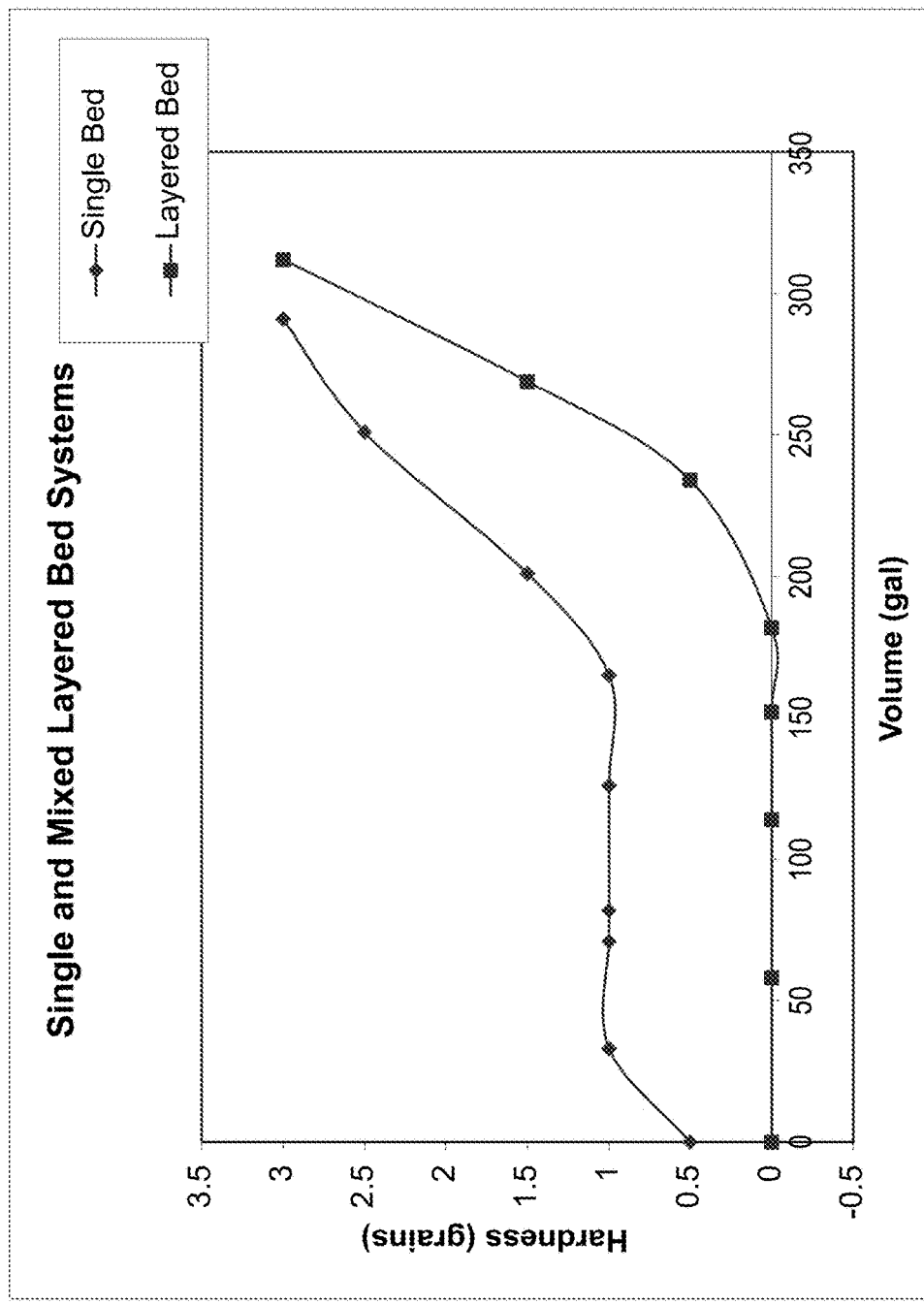
FIG. 8 shows a diagram of the capacity of a layered weak acid ion exchange resin bed (single type of resin) v. a layered weak acid ion exchange resin and strong acid ion exchange resin bed on treatment of water hardness.

FIG. 8 shows a diagram of the capacity of the layered bed systems. As shown, the layered weak acid regenerated ion exchange resin provided softened water having between about 0.5 to 1 grains, whereas the layered mixed bed of weak acid regenerated ion exchange resin and a strong acid regenerated ion exchange resin provided softened water having 0 grain hardness. The use of the layered mixed bed employing the strong acid cation exchange resin provided greater reduction in water hardness, despite its overall lower capacity for reducing water hardness if used alone. However, the water softened using the layered weak acid regenerated ion exchange resins provided the additional benefit of providing reduced pH softened water, which provides additional cleaning benefits.

As shown in the figure, each of the layered beds demonstrated softening efficacies sustained for at least about 150 gallons of treated water. Thereafter between about 150 gallons to 200 gallons the resins became exhausted and were unable to continue to sufficiently remove water hardness. According to aspects of the invention, for the evaluated water treatment apparatuses in this Example, the use of acid regeneration would need to be employed after about 150 gallons of treated water.

Figure 9:
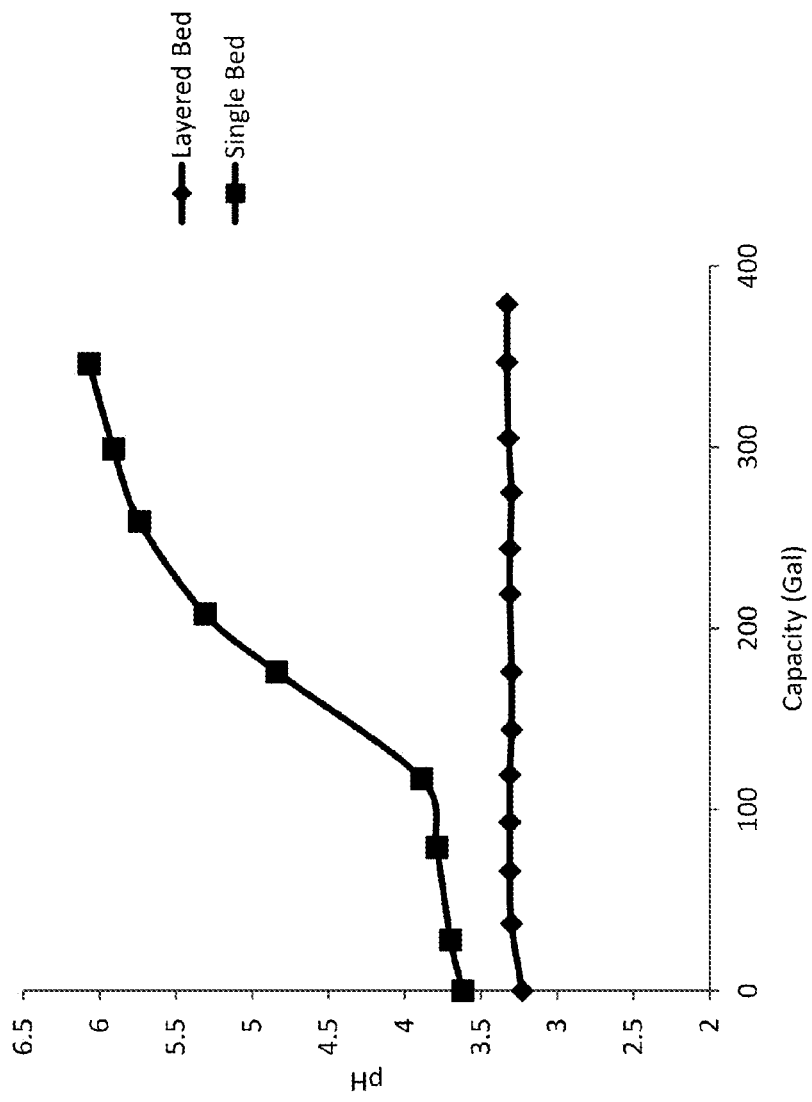
FIG. 9 shows a diagram of the pH v. the capacity (gallons) of a layered weak acid ion exchange resin bed (single type of resin) v. a layered weak acid ion exchange resin and strong acid ion exchange resin bed.

FIG. 9 shows a diagram of the pH versus the capacity of the layered bed systems. As shown, the layered weak acid ion exchange resin bed (i.e. employing a single type of resin) resulted in less acidified treated water source as the capacity of the system was tested. Namely, above about 200 gallons of treated water, the pH of the single resin layered bed began to increase above about 4, whereas the layered mix resin bed system maintained a constant acidified water having a pH between about 3 to about 3.5.

Example 6

The use of an acid regenerant according to embodiments of the invention were analyzed. A single weak acid resin bed, such as disclosed in Example 4 was regenerated using various acid regenerants disclosed herein. It was found that the regeneration process is initially dominated by thermodynamics. A regenerant with a sufficiently low pH will drive the process over the energy barrier, showing a fast pH drop at the first several minutes. Thereafter, the regeneration process is controlled by kinetics. This requires a regenerant to be used for a sufficient amount of time (e.g. about 5 to about 90 minutes) to drive the regeneration of the resin to completion.

Figures 10A, 10B:
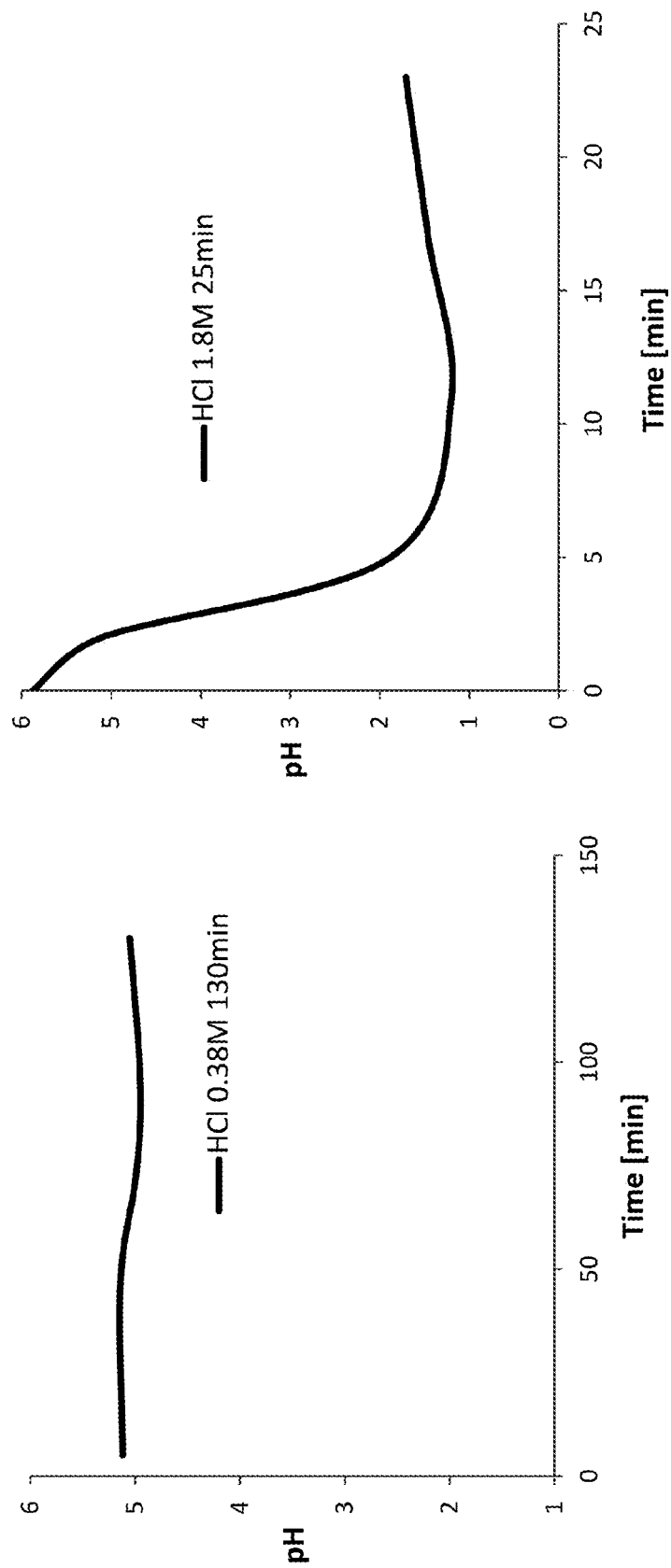
FIGS. 10A-10B show diagrams of the pH achieved from the acid resins resulting from the regeneration using a strong acid regenerant according to an embodiment of the invention.

As shown in FIGS. 10A-B the use of a strong acid regenerant (HCL 0.38M (FIG. 10A), HCL 1.8M (FIG. 10B)) is required to sufficiently decrease the pH in the weak acid resin. According to embodiments of the invention the concentration of the acid regenerant used in the regeneration cycle will depend upon the molarity of the acid employed. In some embodiments, the concentration of the acid used in a solution for providing the acid regenerant to the ion exchange resin is from about 1% to about 20%, from about 2% to about 10%, or about 10% for regeneration.

Figure 11:
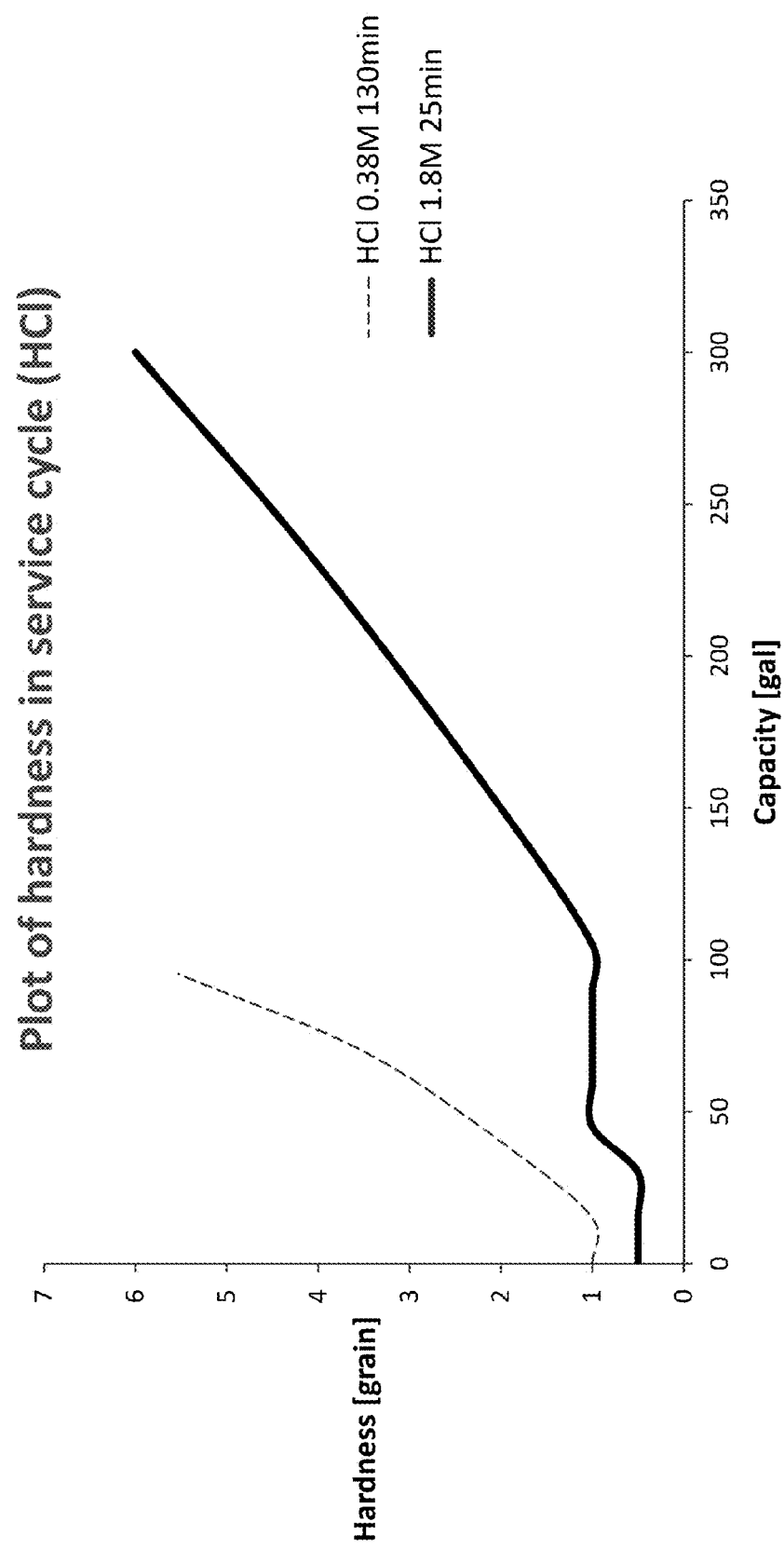
FIG. 11 shows a diagram of the hardness of treated water after the regeneration of the resin employing the exemplary acid regenerants of FIGS. 10A-10B according to an embodiment of the invention.

After the resin has been regenerated, as shown in FIGS. 10A-B, an exemplary service cycle (i.e. treating hard water with the acid regenerated resin) can be used to again provide a treated acidified water source. As shown in FIG. 11, the use of the strong acid regenerant of FIG. 10B provides superior treatment capacity for a longer service cycle.

Example 7

Figure 12:
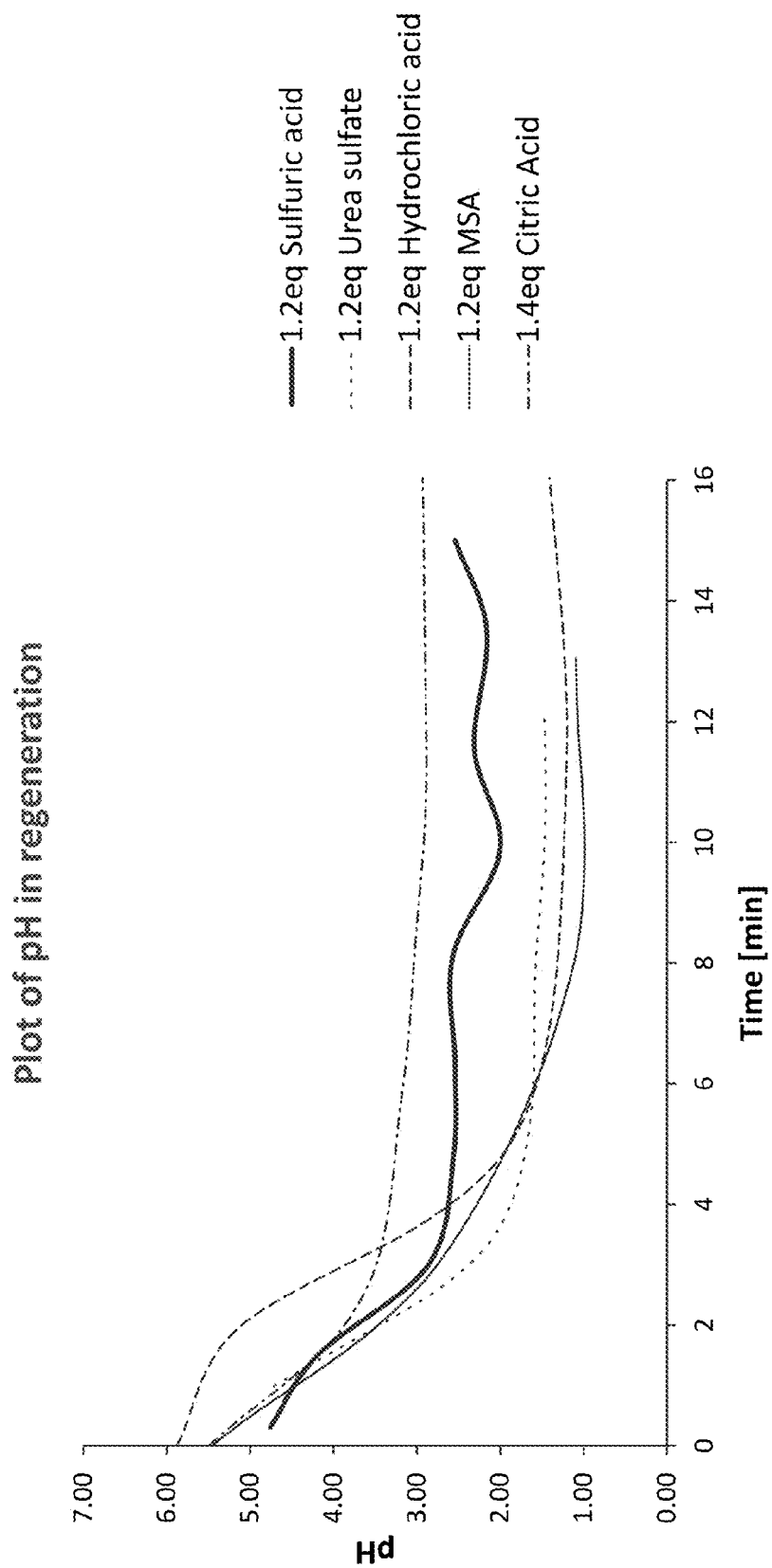
FIG. 12 shows a diagram of the pH of the resin employing various suitable acid regenerants according to embodiments of the invention.

The use of additional acid regenerants was evaluated pursuant to the results of Example 6. The following acid regenerants were employed and reported in equivalence of the various acids employed: 1.2 eq sulfuric acid, 1.2 eq urea sulfate, 1.2 eq hydrochloric acid, 1.2 eq MSA, and 1.4 eq citric acid. FIG. 12 shows the drop in pH of the resin during a regeneration step employing the various acid regenerants. Beneficially, the use of equivalence of the various acids employed in this examples takes into account the various fluctuating factors, including for example, the size of the system, amount of hardness to be removed, etc.

Figure 13:
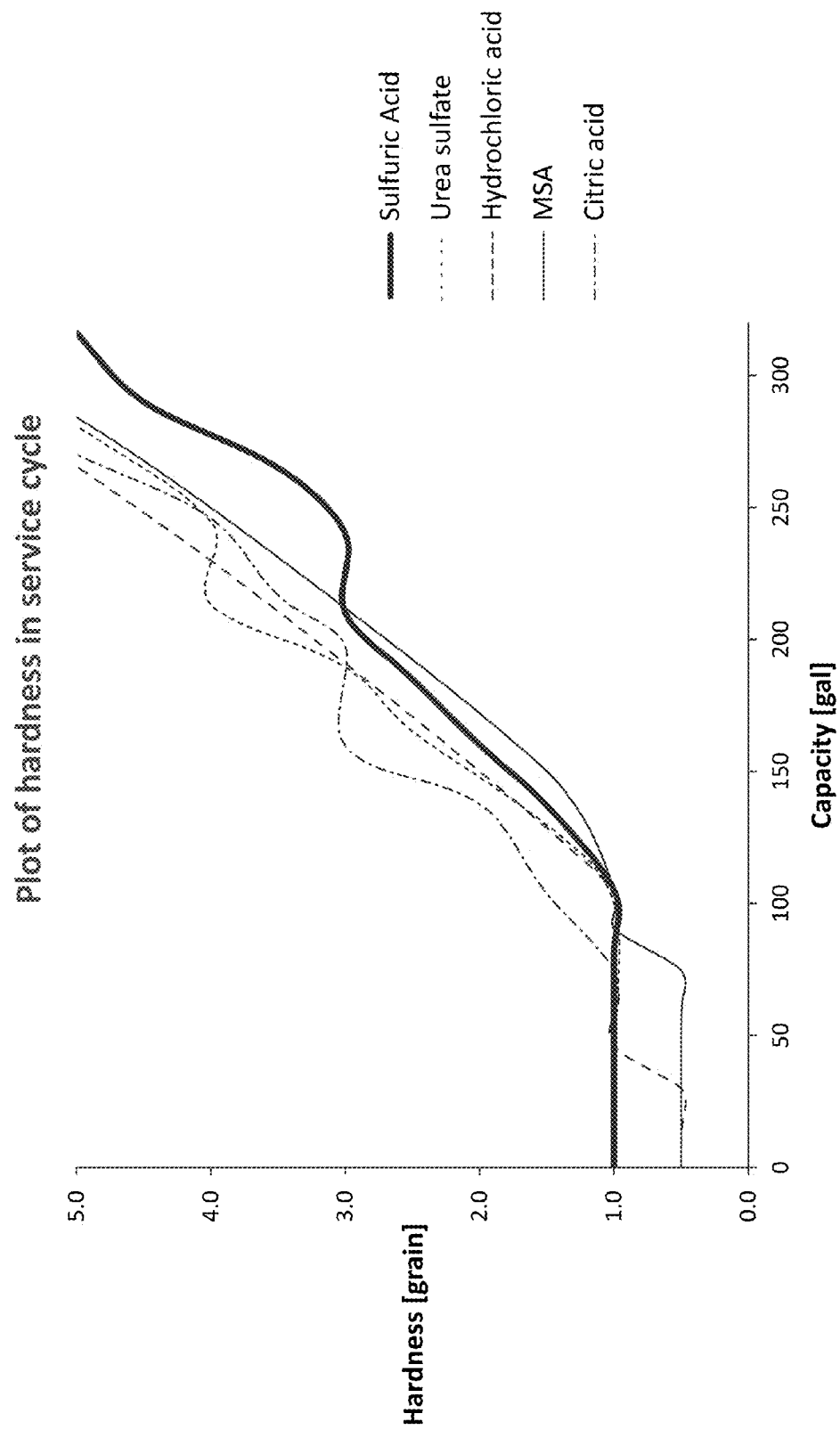
FIG. 13 shows a diagram of the hardness of treated water after the regeneration of the resin employing the various suitable acid regenerants of FIG. 12 according to embodiments of the invention.

After the resin has been regenerated, as shown in FIG. 12, an exemplary service cycle (i.e. treating hard water with the acid regenerated resin) was employed to determine the efficacy of service cycles, as measured by water hardness of the treated water source, based on the use of the various acid regenerants. As shown in FIG. 13, the service cycle of various acid regenerant provided treated acidic water having a hardness of about 1 or less than about 1 for at least 100 gallons of treated water.

Example 8

Testing was completed to demonstrate that coconut soap is a feasible candidate for an all-purpose cleaner ingredient when using Weak Acid Cation (WAC) or Strong Acid Cation (SAC) conditioned water (e.g. treated acidic water sources according to embodiments of the invention). The transmission of different water solutions with coconut soap were tested and compared. Water types tested were 17 grain, 0 grain, deionized, brineless conditioned WAC and SAC treated acidic water. The brineless conditioned WAC water was conditioned with a water softener tank that was filled with weak acid cation (WAC) resin and was regenerated with urea sulfate. The brineless conditioned SAC water was conditioned with a water softener tank that was filled with strong acid cation (WAC) resin and was regenerated with sulfuric acid. The weak acidic resin employed was a polyacrylic copolymer with carboxylic acid functional groups (commercially-available as Amberlite IRC 76; Dowex MAC-3).

Test Methods: 30% coconut soap was prepared by obtaining 20 mL 3% solutions of coconut soap and each water type (i.e. 0.6 g of coconut soap and 20 mL of water) to yield a 1% active solution of coconut soap. A sonicator was used for 1 minute to aid in mixing and dissolution. Then some of each solution was added to a cuvette and tested for transmission using a Cary 100 Bio UV-Vis Spectrophotometer (a blank filled with DI water was used as the reference standard). The transmission was tested over the wavelengths of 400-900 nm. Then the pH of each solution was measured and recorded. The same sample solutions were then titrated with a pipet using a 5% NaOH solution. The caustic solution was used to clear up the solutions with lower pH. The pH after the caustic solution was added was measured and recorded. Transmission was measured again over the wavelengths of 400-900 nm.

In this experiment, hardness and pH are the most important factors in determining the transmission of the coconut soap solutions. In the solution, the hardness molecules form a complex with the fatty acid of the coconut soap, causing the solution to appear cloudier and to have a lower transmission. Table 3 shows the water analysis data for each water solution used.

TABLE 3

| Sample | pH | Hardness (GPG) | TDS (ppm) |
| --- | --- | --- | --- |
| 17 grain | 8.47 | 16.5 | 358.0 |
| WAC | 4.97 | 0.9 | 59.4 |
| SAC | 3.02 | <Level of Detection | 312 |
| 0 grain | 8.57 | 0.2 | 414.0 |
| DI | 5.75 | <Level of Detection | 5.98 |

In this experiment, when originally measuring transmission, the water solutions that have a lower pH such as WAC, SAC, and DI were cloudier than desired. There are three factors that can cause cloudiness in the solutions with coconut soap: temperature, hardness, and pH. The temperature in this experiment was held constant at room temperature; therefore this can be ruled out as a factor affecting the cloudiness. The results of the original transmission measurements do not correlate well with the measured hardness of each sample and what is expected, suggesting the impact of pH. It was observed that the solutions with the lower pH water tended to be cloudier than expected. This is due to the interaction of the protons and the sodium laurate that is found in the coconut soap. In the lower pH solution, sodium laurate in the coconut soap is being protonated to form lauric acid, which is not very soluble in water, thus yielding a lower transmission and forming the cloudiness seen in the solution. It was found that by adding a caustic solution to the coconut soap/water solutions, the lower pH was accommodated for and the transmission for the lower pH solutions increased.

Figure 16:
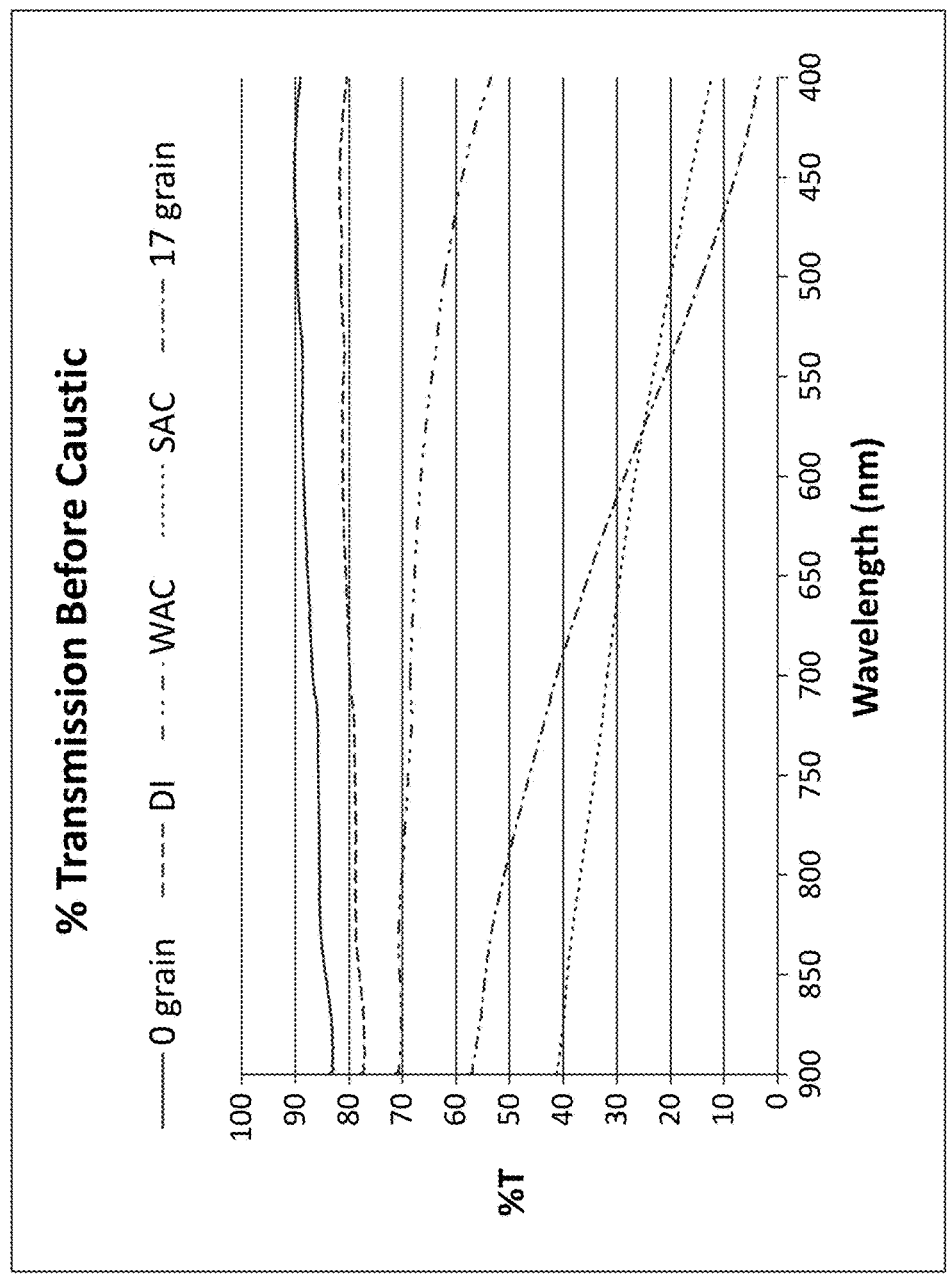
FIG. 16 shows a graph of the percentage transmission within various soap solutions generated with various water sources, including 0 grain water, deionized water, treated acidic water according to embodiments of the invention (including a weak acid cation exchange resin and a strong acid cation exchange resin for producing the treated acidic water), and hard water (e.g. 17 grain) demonstrating the impact of the quality of water on the generation of cleaning solutions.
Figure 17A:
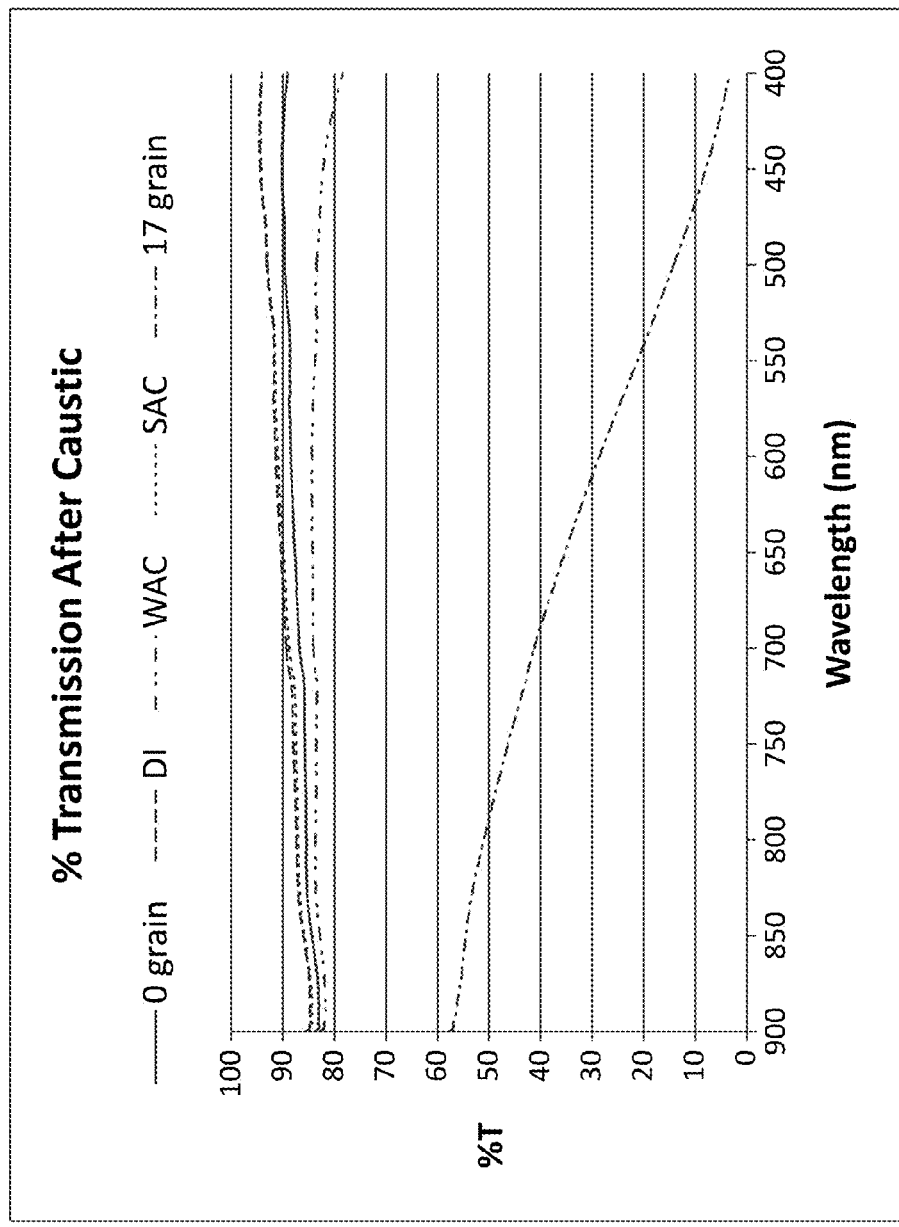
FIGS. 17A-17B show additional graphs of the percentage transmission within various soap solutions generated with various water sources, including 0 grain water, deionized water, treated acidic water according to embodiments of the invention (including a weak acid cation exchange resin and a strong acid cation exchange resin for producing the treated acidic water), and hard water (e.g. 17 grain) demonstrating the impact of the quality of water on the generation of cleaning solutions.
Figure 17B:
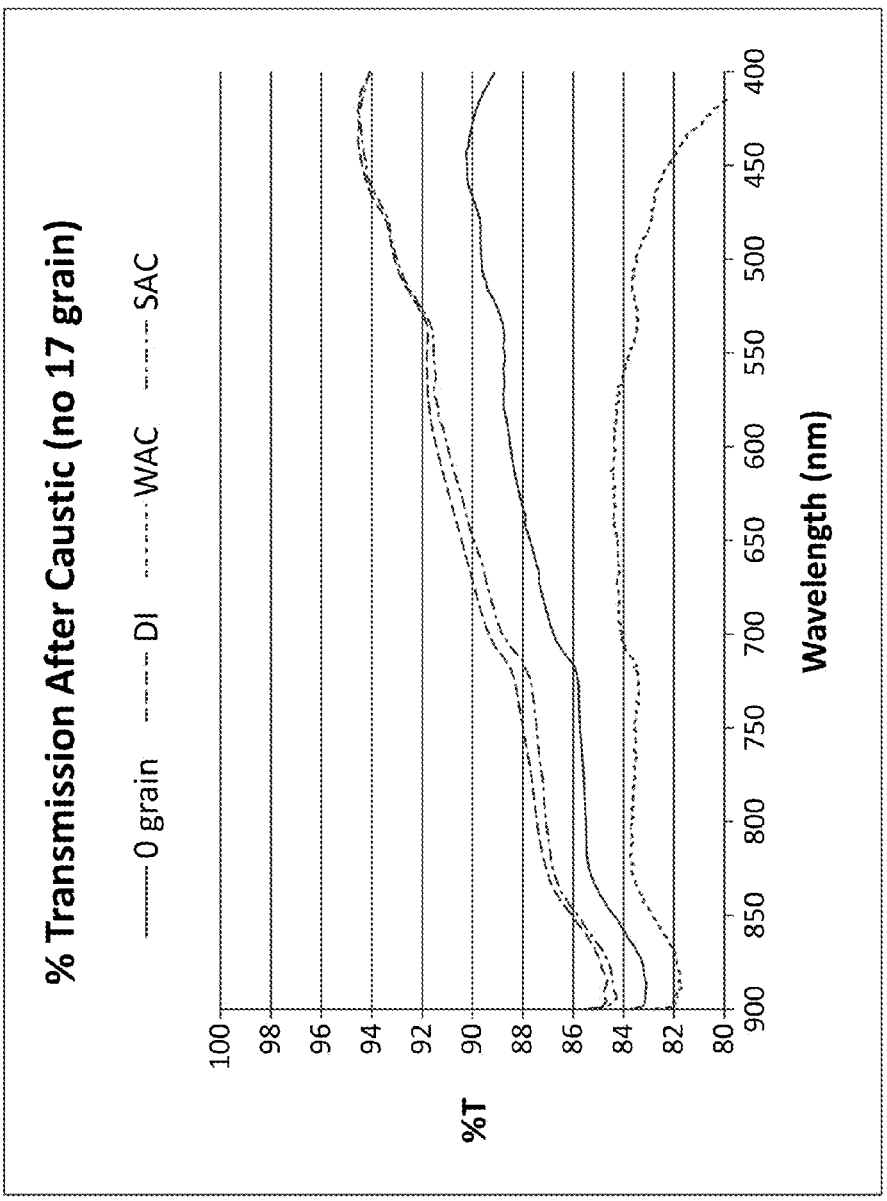

FIG. 16 shows the percentage transmission within various soap solutions generated with various water sources (before addition of caustic as outlined above), demonstrating the impact of the quality of water on the generation of cleaning solutions. FIGS. 17A-B show the percentage transmission within various soap solutions generated with various water sources (after addition of caustic as outlined above), including a closer (zoomed image) in FIG. 17B, demonstrating the impact of the quality of water on the generation of cleaning solutions.

The hardness molecules in water were found to form a complex causing a cloudiness to appear in solution and a lower transmission to be observed. It was also observed that a lower pH affects cloudiness and transmission due to the protonation of sodium laurate to form lauric acid, a less soluble compound. By adding caustic NaOH, this interaction was reversed and the WAC and SAC coconut soap solutions were clearer and had an exceedingly higher transmittance percentage. From this data, it is proven that coconut soap is a favorable candidate to be used in all-purpose cleaners or glass cleaners using brineless conditioned WAC and SAC water. The treated water sources provide a high quality soap solution, in comparison to the unstable suspension with hard water. This demonstrates that coco soap is suitable for use as a cleaning composition in locations where a softened water source is available, such as according to embodiments of the invention.

Example 9

To show the effects of using different types of water that would be used in glass cleaners, Total Dissolved Solid (TDS) deposition on glass was tested with different water types compared with Brineless Conditioned Water (WAC water). Water types tested were 17 grain, 0 grain, DI, and WAC water. The brineless conditioned water was conditioned with a water softener tank that was filled with weak acid cation (WAC) resin and was regenerated with urea sulfate. It is believed that the WAC water will show a significant improvement visually and through data collection to the 0 grain and 17 grain water sample TDS deposition. The weak acidic resin employed was a polyacrylic copolymer with carboxylic acid functional groups (commercially-available as Amberlite IRC 76; Dowex MAC-3).

Test Methods: A 50:50 water/methanol solution was prepared with each type of water. The experiment was performed on 75×25 mm micro slides (thickness=0.96-1.06 mm). The slides were cleaned with acetone followed by methanol, wiping each time with a wipe. A micropipette was set to dispense 250 μL was used to dispense each 50:50 water/methanol solution onto the slides. 10 pipets full (2500 μL total) were dispensed on each slide and allowed to evaporate on a hot plate set to 35° C. The hot plate was cleaned with methanol before each set of slides. The back of the slides were cleaned with methanol and each slide was labeled and stored in a plastic bin lined with wypall towels. A spectrophotometer CM-3600d was used to determine transmittance and lightness (L*).

TABLE 4

| Sample | pH | Hardness (GPG) | TDS (ppm) |
|---|---|---|---|
| 0 grain | 8.57 | 0.2 | 414.0 |
| 17 grain | 8.47 | 16.5 | 358.0 |
| WAC | 4.97 | 0.9 | 59.4 |
| DI | 5.75 | <Level of Detection | 5.98 |

According to the water analysis set forth in Table 4), 0 grain water has the highest amount of TDS followed by 17 grain, then WAC water, and lastly DI water. Although 0 grain water has a lower level of hardness molecules than 17 grain, it has a higher amount of TDS. This is due to the way that the water is conditioned. The 0 grain water is softened by a water softener that uses brine regeneration and therefore the byproducts of the ion exchange reaction in the tank are sodium molecules. Sodium molecules are quite heavy, thus yielding a higher TDS value (in ppm). The WAC water has a lower hardness level as well because it is softened by a water tank that uses brineless regeneration. With brineless regeneration, the functional group on the resin is COOH rather than Na; this yields a lower amount of TDS because the byproducts of the ion exchange are $H_2O$ and $CO_2$.

In contrast, DI water is conditioned by reverse osmosis (RO), which is a technology that uses a membrane for filtration and removes many types of large molecules as well as ions from the solution by applying pressure to the solution on one side of the membrane and forcing pure solution to pass to the other side. Although this system works well at purifying the water, it does not, however, do it in the most efficient fashion. In most cases, only half of the water put into RO is yielded in the final purified version; the other half is RO waste that is disposed of.

Figure 18:
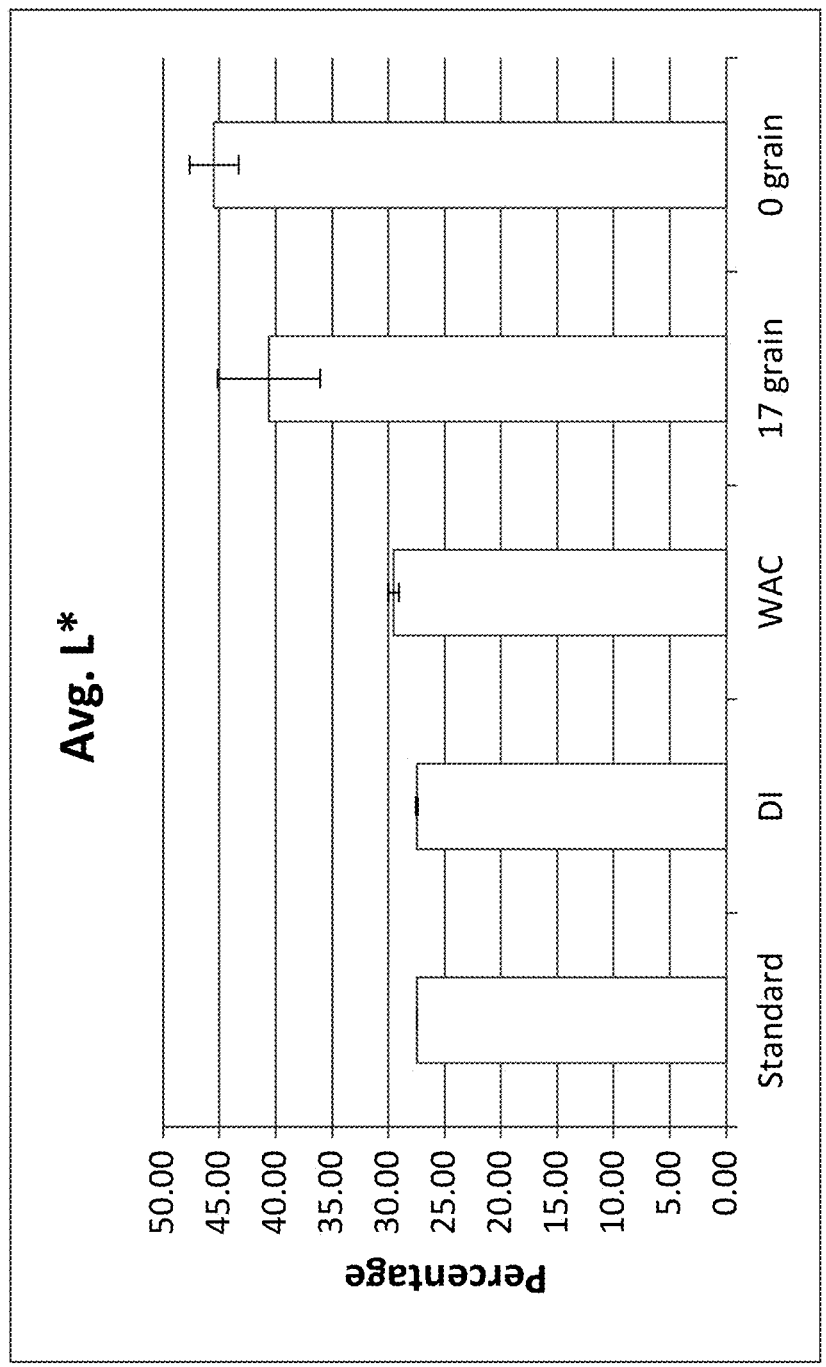
FIG. 18 shows transmission data collected from detergent compositions using various water sources according to embodiments of the invention, wherein the TDS of the various compositions was significantly lower for WAC treated acidic water according to embodiments of the invention.

The transmission data collected was determined using colorimetry as shown further in Tables 5-6. The L* value displayed is the lightness of the sample, where 0% is absolute black and 100% is absolute white. The DL* value is the L* value in relation to the standard. Note: the percent transmittance shown is the average over all wavelengths (400-700 nm). FIG. 18 is a visual comparison of the TDS deposition on the slides (wherein the 0 grain and 17 grain samples have over 85% more TDS than the WAC treated acidic water).

TABLE 5

| Sample | L* (%) | DL* (%) | % Transmittance |
|---|---|---|---|
| Standard | 27.46 | 0.00 | 5.26 |
| DI-6 | 27.55 | 0.09 | 5.30 |
| DI-7 | 27.36 | −0.09 | 5.23 |
| DI-8 | 27.47 | 0.01 | 5.27 |
| WAC-6 | 29.99 | 2.53 | 6.32 |
| WAC-7 | 29.52 | 2.06 | 6.14 |
| WAC-8 | 29.05 | 1.59 | 5.93 |
| 17-6 | 45.85 | 18.39 | 15.22 |
| 17-7 | 38.17 | 10.72 | 10.17 |
| 17-8 | 37.82 | 10.36 | 9.93 |
| 0-6 | 45.19 | 17.74 | 14.93 |
| 0-7 | 47.76 | 20.30 | 16.88 |
| 0-8 | 43.43 | 15.97 | 13.69 |

TABLE 6

| Sample | Avg L* | Avg DL* | Avg % Transmittance |
|---|---|---|---|
| Standard | 27.46 | 0.00 | 5.26 |
| 17 grain | 40.61 | 13.16 | 11.77 |
| 0 grain | 45.46 | 18.00 | 15.17 |
| WAC | 29.52 | 2.06 | 6.13 |
| DI | 27.46 | 0.00 | 5.27 |

As shown in FIG. 18 and Tables 5-6, the WAC water had a lower TDS deposition than 0 grain and 17 grain water, which was seen visually as well as proven through the data collected from the spectrophotometer. While the WAC water showed more TDS deposition than the DI water, it must be noted that the DI water was conditioned by reverse osmosis (RO), the limitations of which are set forth in further detail above. The WAC water, on the other hand, was conditioned by a water conditioning unit (e.g. softener tank) that uses brineless regeneration. With brineless regeneration, the functional group on the resin is COOH; this yields a lower amount of TDS because the byproducts of the ion exchange reaction are H$_2$O and CO$_2$. Beneficially, the employed system demonstrated an 85% reduction in TDS of the water source. This process not only significantly lowers the TDS, it also lowers the hardness and does so in a rather efficient manner (≈95% efficiency). In conclusion, WAC water is an excellent candidate to be used as the water source for diluting concentrated glass cleaner solutions, not only for its low hardness and TDS levels, but also for its efficiency in production.

In an aspect, the specifications of the treated water source can be specified according to a desired application of use. For example, the water source and/or the resin(s) employed can be modified to achieve a further decrease in TDS, in addition to the hardness and/or pH of the treated water source. This is highly desirable, for example, as depending upon the cleaning application a distinct treated water specification may be desired. In an aspect, a warewashing application and/or other all-purpose cleaning composition may require a treated water source having a hardness of less than about 2 grains, a pH less than about 7, preferably less than about 6, and a low total dissolved solids (TDS) of at least less than 200 ppm. In another aspect, a cleaning composition for a glass surface may require a treated water source having a hardness of less than about 1 grain, a pH less than about 7, preferably less than about 6, and a low total dissolved solids (TDS) of at least less than 100 ppm. Beneficially, according to the invention, the resin(s) employed for use of the methods of the invention may be modified along with and/or in addition to the characteristics of the incoming water source in need of treatment. As a result, according to embodiments of the invention, the treated water source for uses disclosed herein can be particularly modified for any specific application of use.

The inventions being thus described, it will be obvious that the same may be varied in many ways. Such variations are not to be regarded as a departure from the spirit and scope of the inventions and all such modifications are intended to be included within the scope of the following claims.

The invention claimed is:

1. A dispensing system employing an ion exchange resin regenerated by an acid comprising:
   a water inlet for providing a water source to a water conditioning unit, wherein the water inlet is in fluid communication with the water conditioning unit;
   a functional ingredient inlet for providing additional functional ingredients to a water conditioning unit, wherein the functional ingredient inlet is in fluid communication with the water conditioning unit;
   a water conditioning unit comprising a water treatment component housed within, wherein said water treatment component comprises at least one weak acid and/or strong acid ion exchange resin capable of generating a treated water source by exchanging protons on said resin for dissolved cations including water hardness ions and total dissolved solids in said water source;
   an outlet for providing the treated water source to a water delivery line, wherein the water delivery line is in fluid communication with the water conditioning unit and a blending unit, wherein the blending unit generates and/or dispenses a use solution of a cleaning composition by combining the treated water source with a concentrated cleaning composition; and
   wherein the treated water source meets a defined water specification, and wherein the water specification is a softened, acidic water having a total dissolved solids (TDS) below about 200 ppm, a hardness level of less than about 2 grains and a pH less than about 6.

2. The system according to claim 1, further comprising a cleaning composition use solution delivery line that is in fluid connection with the blending unit to provide the generated cleaning composition use solution to a point of use or delivery device (e.g. dispensing bottle).

3. The system according to claim 1, wherein said additional functional ingredients include surfactants, wetting agents, sanitizing agents, sterilizing agents, acidic detergents, enzymatic detergents and combinations thereof.

4. The system according to claim 1, wherein said ion exchange resin is a weak acid exchange resin having a polyacrylic copolymer matrix and carboxylic acid functional group and/or a strong acid exchange resin having a polystyrene matrix and sulfonic acid functional group.

5. The system according to claim 1, wherein said ion exchange resin is an acid exchange resin selected from the group consisting of a cross-linked acrylic acid with carboxylic acid functional group, a cross-linked methacrylic acid with carboxylic acid functional group, a polystyrene with sulfonic acid functional group, a polystyrene with sulfonic acid functional group and mixtures of thereof.

6. The system according to claim 1, wherein said ion exchange resin has a surface comprising carboxylic acid functional groups and/or sulfonic acid functional groups.

7. The system according to claim 1, further comprising an additional water treatment apparatus and water delivery line in fluid connection with the water treatment reservoir.

8. The system according to claim 1, further comprising a measuring device for obtaining pH and/or proton concentration and/or total dissolved solids measurements from the water treatment reservoir, the water source and/or the treated water source, and a controller to receive the measurements and trigger an event.

9. The system according to claim 1, further comprising a storage reservoir housing an acid regenerant and a delivery line fluidly connected to the water treatment reservoir to deliver the acid regenerant to the ion exchange resin.

10. The system according to claim 1, wherein the ion exchange resin is regenerated using an acid regenerant upon exhaustion, wherein said exhaustion may be measured according to a measurement of total dissolved solids (TDS) above about 200 ppm, a hardness level of greater than about 2 grains and/or a pH greater than about 6 within the treated water source and/or the use solution of the cleaning composition.

11. A method of generating a use solution of a cleaning composition employing a water source from an ion exchange resin regenerated by an acid comprising:
   providing a water source to a water conditioning unit comprising: a water inlet for providing the water source, wherein the water inlet is in fluid communication with the water conditioning unit; a functional ingredient inlet for providing additional functional ingredients, wherein the functional ingredient inlet is in fluid communication with the water conditioning unit, and wherein the additional functional ingredients include surfactants, wetting agents, sanitizing agents, sterilizing agents, acidic detergents, enzymatic detergents, and combinations thereof; a water treatment component housed within the water conditioning unit, wherein said water treatment component comprises at least one weak acid and/or strong acid ion exchange resin capable of generating a treated water source by exchanging protons on said resin for dissolved cations including water hardness ions and total dissolved solids in said water source; and an outlet for providing the treated water source to a water delivery line, wherein the water delivery line is in fluid communication with the water conditioning unit and a blending unit;

generating the treated water source, wherein the treated water source meets a defined water specification, and wherein the water specification is a softened, acidic water having a total dissolved solids (TDS) below about 200 ppm, a hardness level of less than about 2 grains and a pH less than about 6; and providing the treated water source to the blending unit to generate and/or dispense a use solution of a cleaning composition by combining the treated water source with a concentrated cleaning composition.

12. The method according to claim 11, wherein said ion exchange resin is a weak acid cation exchange resin selected from the group consisting of a cross-linked polyacrylic with carboxylic acid functional group, a cross-linked polymethacrylic with carboxylic acid functional group and mixtures of thereof, and/or a strong acid cation exchange resin selected from the group consisting of a polystyrene with sulfonic acid functional group, a polystyrene with sulfonic acid functional group and mixtures of thereof.

13. The method according to claim 11, wherein said ion exchange resin is a layered bed system employing at least two of said cation exchange resins.

14. The method according to claim 11, further comprising measuring pH and/or proton concentration and/or total dissolved solids (TDS) within the treated water source and/or use solution of the cleaning composition, and triggering an event as a result of the obtained measurement.

15. The method according to claim 14, wherein a differential pH and/or proton concentration measurement is obtained from said water source and said treated water source and/or use solution of the cleaning composition.

16. The method according to claim 14, wherein the triggered event is selected from the group consisting of regenerating the resin of the water treatment component, varying a detergent or other chemistry addition to the treated water source and/or use solution of the cleaning composition.

17. The method according to claim 16, wherein the regeneration of the resin is triggered and comprises providing an acid regenerant to the resin, displacing water hardness ions on the resin with protons from the acid regenerant, and generating a regeneration step effluent water.

18. A method of cleaning using a cleaning solution generated on-site employing a water source from an ion exchange resin regenerated by an acid comprising:

providing a water source to a water conditioning unit comprising: a water inlet for providing the water source, wherein the water inlet is in fluid communication with the water conditioning unit; a functional ingredient inlet for providing additional functional ingredients, wherein the functional ingredient inlet is in fluid communication with the water conditioning unit, and wherein the additional functional ingredients include surfactants, wetting agents, sanitizing agents, sterilizing agents, acidic detergents, enzymatic detergents, and combinations thereof; a water treatment component housed within the water conditioning unit, wherein said water treatment component comprises at least one weak acid and/or strong acid ion exchange resin capable of generating a treated water source by exchanging protons on said resin for dissolved cations including water hardness ions and total dissolved solids in said water source; and an outlet for providing the treated water source to a water delivery line, wherein the water delivery line is in fluid communication with the water conditioning unit and a blending unit;

generating the treated water source, wherein the treated water source meets a defined water specification, and wherein the water specification is a softened, acidic water having a total dissolved solids (TDS) below about 200 ppm, a hardness level of less than about 2 grains and a pH less than about 6;

providing the treated water source to the blending unit to generate and/or dispense a use solution of a cleaning composition by combining the treated water source with a concentrated cleaning composition; and contacting a surface and/or substrate in need of cleaning with the use solution of the cleaning composition.

19. The method according to claim 18, wherein the treated water source reduces the total detergent, threshold agent and/or polymer requirement for the cleaning composition, and wherein the use of said treated water source improves cleaning efficacy as measured by a reduction in spotting and filming and/or preventing scale build up on articles and surfaces in comparison to cleaning with compositions without the treated water source.

20. The method according to claim 18, wherein said surface in need of cleaning is glass and wherein the treated water source has a TDS below about 100 ppm.

* * * * *